(12) United States Patent
Sousa et al.

(10) Patent No.: US 8,319,545 B2
(45) Date of Patent: Nov. 27, 2012

(54) CHARGE PUMP WITH REDUCED CURRENT VARIATION

(75) Inventors: Joseph Sousa, Lawrence, MA (US); Andrew Thomas, Arlington, MA (US)

(73) Assignee: Linear Technology Corporation, Milpitas, CA (US)

( * ) Notice: Subject to any disclaimer, the term of this patent is extended or adjusted under 35 U.S.C. 154(b) by 227 days.

(21) Appl. No.: 12/711,828

(22) Filed: Feb. 24, 2010

(65) Prior Publication Data
US 2011/0204959 A1      Aug. 25, 2011

(51) Int. Cl.
     *G05F 1/10*      (2006.01)
(52) U.S. Cl. ........................................................ 327/536
(58) Field of Classification Search ............... 327/535, 327/536, 537
     See application file for complete search history.

(56) References Cited

U.S. PATENT DOCUMENTS

| | | | |
|---|---|---|---|
| 6,392,904 B1 * | 5/2002 | Bayer et al. ..................... 363/59 |
| 6,411,531 B1 | 6/2002 | Nork et al. | |
| 7,190,598 B1 * | 3/2007 | Alenin ........................... 363/60 |
| 7,208,995 B2 * | 4/2007 | Hashimoto ................... 327/536 |
| 7,208,997 B2 * | 4/2007 | Sohara ......................... 327/536 |
| 7,746,676 B2 * | 6/2010 | Feng et al. ...................... 363/60 |
| 7,944,277 B1 * | 5/2011 | Sinitsky et al. ............... 327/536 |
| 8,013,664 B2 * | 9/2011 | Gerber ......................... 327/536 |
| 2003/0174524 A1 | 9/2003 | Botker et al. | |
| 2007/0053216 A1 | 3/2007 | Alenin | |

OTHER PUBLICATIONS

International Search Report for Corresponding PCT Application No. PCT/US2011/025704.
Written Opinion for Corresponding PCT Application No. PCT/US2011/025704.

* cited by examiner

*Primary Examiner* — Jeffrey Zweizig
(74) *Attorney, Agent, or Firm* — McDermott Will & Emery LLP

(57) ABSTRACT

Circuits and methods for maintaining a substantially constant input and output current for a charge pump circuit are provided which reduce current variation during switching intervals. The charge pump circuitry of the present invention maintains a current flow path from a current source to the charge pump output which minimizes or eliminates spikes normally associated with the switching intervals.

51 Claims, 22 Drawing Sheets

CHARGE PUMP WITH REDUCED CURRENT VARIATION

BACKGROUND OF THE INVENTION

This invention relates to charge pump circuitry. More specifically, it relates to charge pump circuitry and methods that provide reduced input and output current variation.

A charge pump is an electronic circuit that typically uses one or more capacitors as an energy storage element to create either a higher or lower voltage from a power source. Charge pump circuits generally operate by controlling the connection of a voltage source to one or more capacitors, usually in two or more phases. For example, in a simple charge pump circuit, to generate a higher voltage, a positive terminal of a capacitor is connected to the voltage source during a first phase. During this phase, a charge is imparted to the capacitor. Next, during a second phase, the capacitor is disconnected from the voltage source and reconnected with its negative terminal coupled to the voltage source.

Because the capacitor retains the difference in voltage between the top and bottom plates, the value of the voltage at the positive terminal is double that of the charging voltage. When the capacitor is discharged, usually into a filter capacitor, an output voltage up to twice the value of the input voltage is provided. Using this principle, further voltage multiplication may be achieved by adding additional capacitors in series to increase the multiplication factor. Variations of this principle allow circuit designers to also obtain fractional voltage multiplication factors, such as two thirds, or one and a half, through the use of the appropriate circuit topology. The frequency with which the charge pump changes phases is typically within the kilohertz to megahertz range and may be selected to minimize the size of the required filter capacitor.

Conventional charge pump circuits, however, exhibit undesirable current characteristics during switching intervals. For example, at the moment switches first connect the charge pump capacitors to a voltage source, a large inrush current flows, charging the capacitors. If the equivalent input impedance of the charge pump is small, this inrush current will be initially very large, then quickly decay, which produces a spike or "impulse" load on the input voltage at the switch transition point.

Because these switch transitions occur at a relatively high frequency, certain sensitive systems will be disturbed by this behavior, particularly if the source impedances in the system are comparable to the switch and wiring resistance of the charge pump circuit. Moreover, these impulses may contain substantial high-frequency content that can excite any high-Q elements they couple to, e.g. parasitic inductance and bypass capacitances. Similarly, the output signal of the charge pump circuit also undesirably includes such spikes at the switch transition point due to the discharge and subsequent decay of output current from the charge pump capacitors.

Various solutions have been proposed to address this problem, some of which have involved forcing a substantially constant input current to the charge pump. This may involve, for example, the use of two or more charge pump systems, each operating in alternative modes (one discharging while the other is charging, etc.). Nevertheless, such systems still produce spikes on their output during switch transitions because of the need for asymmetrical switching to properly operate, which results in the production of either too little or too much current at certain transition points.

Accordingly, in view of the foregoing, it would be desirable to provide circuitry and methods for charge pump circuitry that provide improved current characteristics.

It would be additionally desirable to provide circuitry and methods for charge pump circuitry that reduce or substantially eliminate input and output current variation.

It would be additionally desirable to provide circuitry and methods for charge pump circuitry that produce a substantially constant input and output current over a switching cycle.

SUMMARY OF THE INVENTION

Circuits and methods for maintaining a substantially constant input and output current for a charge pump circuit are provided which reduce current variation during switching intervals. The charge pump circuitry of the present invention maintains a current flow path from a current source to its output which minimizes or eliminates spikes on both input and output currents normally associated with the switching intervals.

One embodiment of a charge pump circuit that provides a substantially constant output current and reduces current variation at switching points in accordance with the present invention includes an input and an output, a first capacitor bank and a second capacitor bank, a first current source for periodically charging the first and second capacitor banks, a second current source for periodically discharging the first and second capacitor banks, a plurality of switching circuits configured to selectively couple the first capacitor bank to the first current source to charge the first capacitor bank, the plurality of switches further configured to selectively couple the second capacitor bank to the second current source to discharge the second capacitor bank in order to provide the substantially constant output current, and wherein during a transition state, the first capacitor bank, the second capacitor bank, and the second current source are coupled to the output such that when the second capacitor bank is disconnected from the charge pump circuit, the output current remains substantially constant and output current variation associated with disconnection of the second capacitor bank is reduced.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
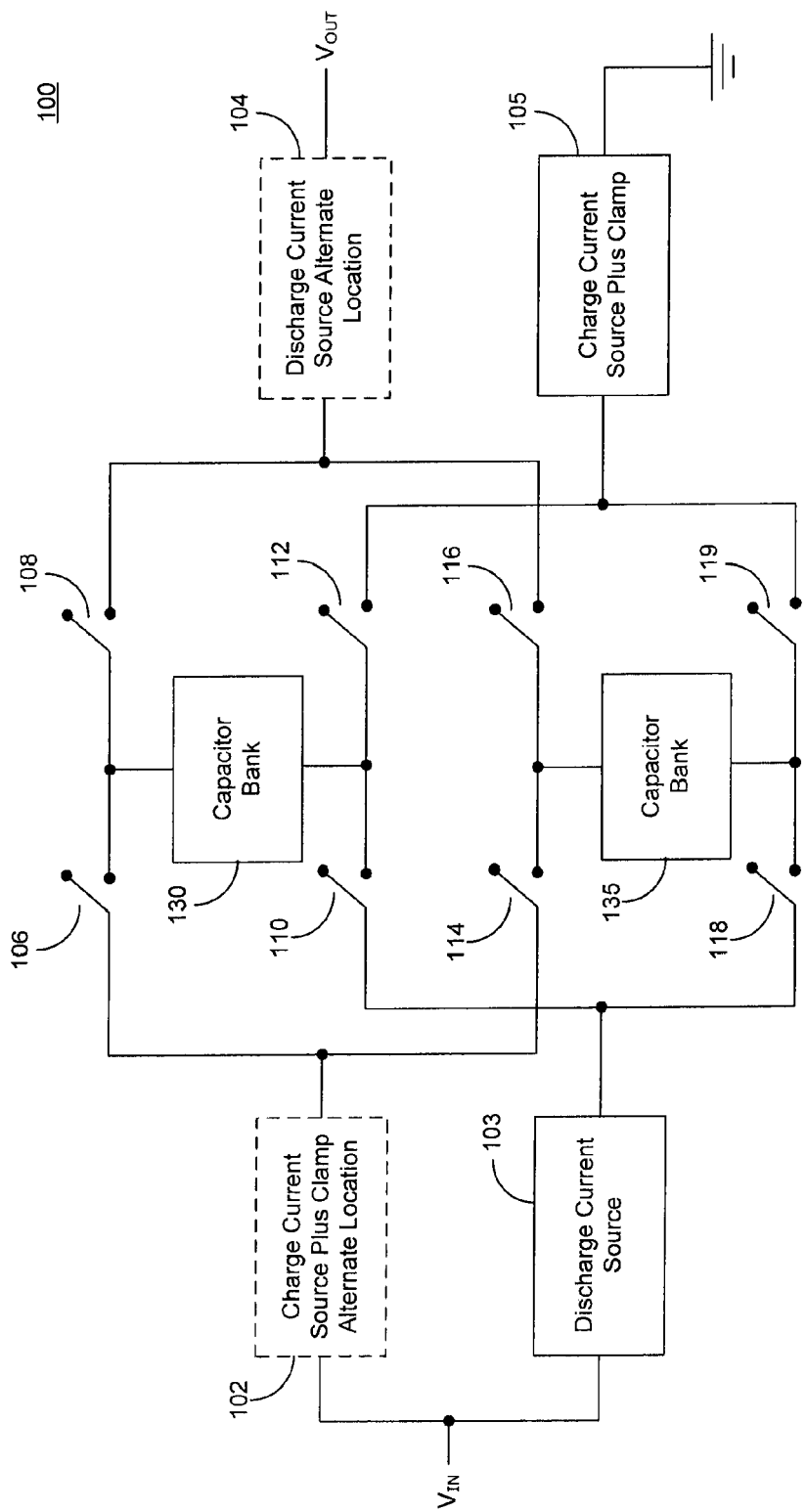
FIG. 1 is a generalized block diagram of one embodiment of a charge pump circuit suitable for providing a boosted output voltage in accordance with the principles of the present invention.

A general block diagram of one embodiment of a charge pump circuit 100 constructed in accordance with the principles of present invention is shown in FIG. 1. This configuration is suitable for providing a boosted voltage at its output, which, when coupled with regulation circuitry, provides a regulated boosted voltage. As shown, circuit 100 may generally include current sources 103 and 105, switches 106-119, and capacitor banks 130 and 135. In some embodiments, circuit 100 may be configured to include alternate current sources 102 and 104 rather than sources 103 and 105 (as indicated by the dotted lines).

Generally speaking, either current sources 103 and 105 are used, or sources 102 and 104, but not both (i.e., only two are used). Embodiments using current sources 102 and 103 may be used if desired, as well as embodiments using current sources 104 and 105. The selection of current source 102 or 105 may be made independently of the selection of current source 103 or 104 and vice versa. Embodiments using current sources 103 and 105 are described herein for simplicity. It will be understood, however, that embodiments using other current sources may be used if desired using the principles described below.

In operation, charge pump circuit 100 may draw a substantially constant input current at $V_{IN}$ and provide a substantially constant output current at $V_{OUT}$. Current spikes at the switching intervals are reduced or substantially eliminated. One way this is may be accomplished is by controlling switches 106-119 such that current source 103 has an uninterrupted current flow path through capacitor banks 130 or 135 from $V_{IN}$ to $V_{OUT}$. Circuit 100 may operate in two (or more) phases such that capacitor bank 130 charges while capacitor bank 135 discharges and vice versa. With the configuration shown in FIG. 1, current source 103 is responsible for discharging capacitor banks 130 and 135, whereas current source 105 is responsible for charging capacitor banks 130 and 135 (described in more detail below in connection with FIG. 3).

Switches 106-119 shown in FIG. 1 may be physically implemented in numerous ways. For example, switches 106-119 may be implemented as any suitable type of armature or semiconductor based switch. Moreover, in some embodiments, current sources 103 and 105 may be controlled or programmable current sources rather than fixed current sources. For example, circuit 100 may contain sensing circuitry (not shown) which adjusts the current level based on certain external conditions such as the input voltage or current provided at $V_{IN}$ or the current or voltage level present (or required) at $V_{OUT}$. Circuit 100 may further interface with or include circuitry for establishing the current level of current sources 103 and 105 such as external digital control signals, or include programmable memory circuits for that may be programmed to establish current level (not shown).

Additionally, current source 105 preferably includes voltage clamp circuitry to prevent its voltage from dropping below a desirable level by shunting current to $V_{IN}$ (or to ground in embodiments using alternate source 102). During transition between operating phases, current source 105 experiences periods during which it is not connected to capacitor banks 130 or 135, and the clamp circuitry provides a current flow path for the source during that time.

In embodiments where such clamp circuitry is included in current source 105, the input current of the circuit is maintained through the transition period at a level substantially the same as it is in other phases. This ensures that the total input current is maintained substantially constant throughout the operation of the charge pump, because the current flow paths from $V_{IN}$ continuously pass through current sources 103 and 105. It will be understood, however, in alternate embodiments, that any other suitable circuitry may be used to maintain the input current substantially constant, if desired.

Figure 2:
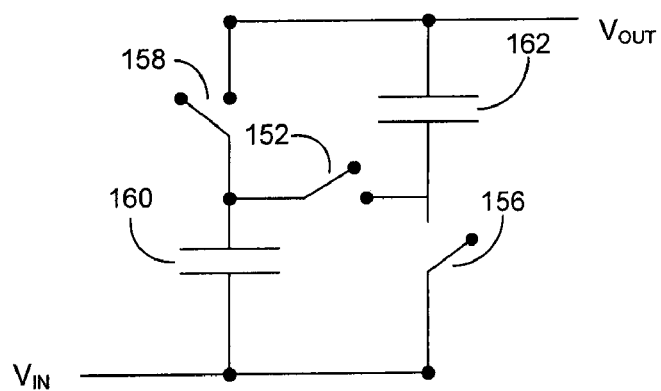
FIG. 2 is an illustrative capacitor bank constructed in accordance with the principles of the present invention.

Capacitor banks 130 and 135 may be configured as capacitor bank 150 shown in FIG. 2. However, any suitable configuration may be used to obtain the desired voltage multiplication factor. As shown, capacitor bank 150 includes switches 152-158 and capacitors 160 and 162. Like switches 106-119, switches 152-158 may be implemented as any suitable armature or semiconductor based switch. Similarly, capacitors 160 and 162 may be any suitable type of discrete capacitor such as an electrolytic or ceramic capacitor or may be a semiconductor based capacitor.

Using this configuration, capacitors 160 and 162 may be connected in series (e.g., by closing switch 152) or in parallel (e.g., by closing switches 156 and 158) to obtain the desired multiplication factor. For example, to obtain a multiplication factor of three, the top plates of capacitors 160 and 162 may be charged by closing switches 156 and 158, and opening switch 152, collectively referred to as the "charge configuration". Next, the capacitors may placed in their discharge configuration by connecting them series (e.g., by closing switch 152 and opening switches 156 and 158). Although only two capacitors are shown, it will be understood that additional ones may be added in series and/or parallel to further extend the number of possible multiplication factors for circuit 100. Moreover, although capacitors banks 130 and 135 are described as being the same, it will be understood that they may differ from one another in configuration.

Referring now back to FIG. 1, circuit 100 may be used to boost the value of the voltage provided at $V_{IN}$ and provide a substantially constant output current with current spikes at the switching intervals minimized or substantially eliminated. As mentioned above, circuit 100 generally operates in two phases, referred to herein as phase 1 and phase 2. During phase 1, capacitor bank 135 is coupled to current source 103 and $V_{OUT}$, causing it to discharge and provide current from current source 103 to $V_{OUT}$. Concurrently, capacitor bank 130 is coupled to $V_{IN}$ and current source 105 causing it to be charged by current drawn from $V_{IN}$ by source 105. Accordingly, during phase 1, capacitor bank 130 is placed in its charging configuration, whereas capacitor bank 135 is in its discharge configuration.

Next, after several transition phases, circuit 100 reaches phase 2 during which capacitor bank 130 is coupled to current source 103 and $V_{OUT}$, causing it to discharge and provide current from current source 103 to $V_{OUT}$. Concurrently, capacitor bank 135 is coupled to $V_{IN}$ and current source 105, which causes it to be charged by current drawn from $V_{IN}$ by source 105. During phase 2, capacitor bank 135 is placed in its charging configuration, whereas capacitor bank 130 is in its discharge configuration. This cycle is repeated, and circuit 100 produces a boosted output voltage with substantially constant input and output current.

The current produced by current source 103 should be selected (or controlled) to be substantially constant and match the desired (or required) output current of circuit 100. This allows circuit 100 to provide a substantially constant output current through capacitor banks 130 and 135. Source 105, however, need only be large enough to replace the charge lost on capacitor banks 130 and 135 during the rest of the switching cycle. Nevertheless, source 105 should also be configured such that it is substantially constant to maintain the input current drawn at $V_{IN}$ substantially constant.

Turning now to FIGS. 3A-3H, a more detailed depiction of circuit 100 and its various phases of operation and transition states is shown. Initially, assume circuit 100 begins in phase 1 of operation (which may occur after a brief initialization phase, during which a minimum amount of charge is imparted to capacitor banks 130 and 135 (e.g., by connecting capacitor banks 130 and 135 to current source 105)).

Figure 3A:
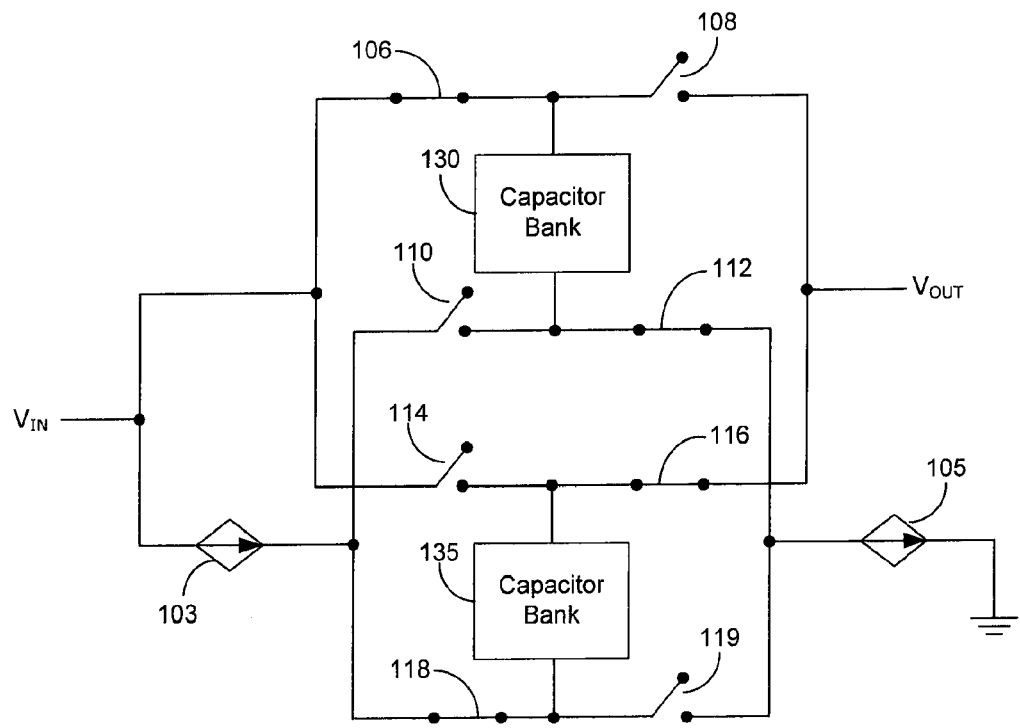
FIGS. 3A-3H are block diagrams illustrating the various states of operation of the charge pump circuit of FIG. 1.

At this point, switches 106, 112, 116 and 118 are closed, with the remainder of the switches open. This is shown in FIG. 3A. Using this configuration, current flows from $V_{IN}$, through source 103 and switch 118 to capacitor bank 135, which is discharging through switch 116 to $V_{OUT}$. As mentioned above, the value of current source 103 is selected to substantially match the desired output current. As a result, the output current at $V_{OUT}$ matches this current value. In addition, current flows from $V_{IN}$, through switch 106 to capacitor bank 130, which is charging based on the current drawn by source 105 through switch 112. During phase 1, capacitor bank 130 is placed in its charging configuration, whereas capacitor bank 135 is in its discharge configuration.

Figure 3B:
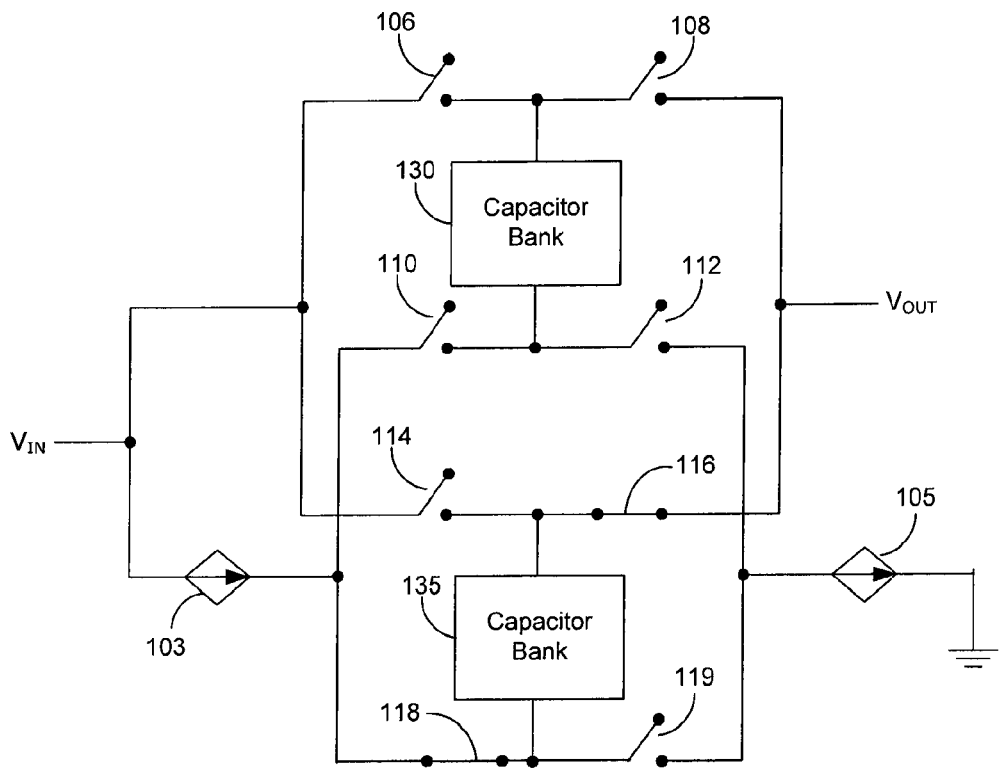
Figure 3C:
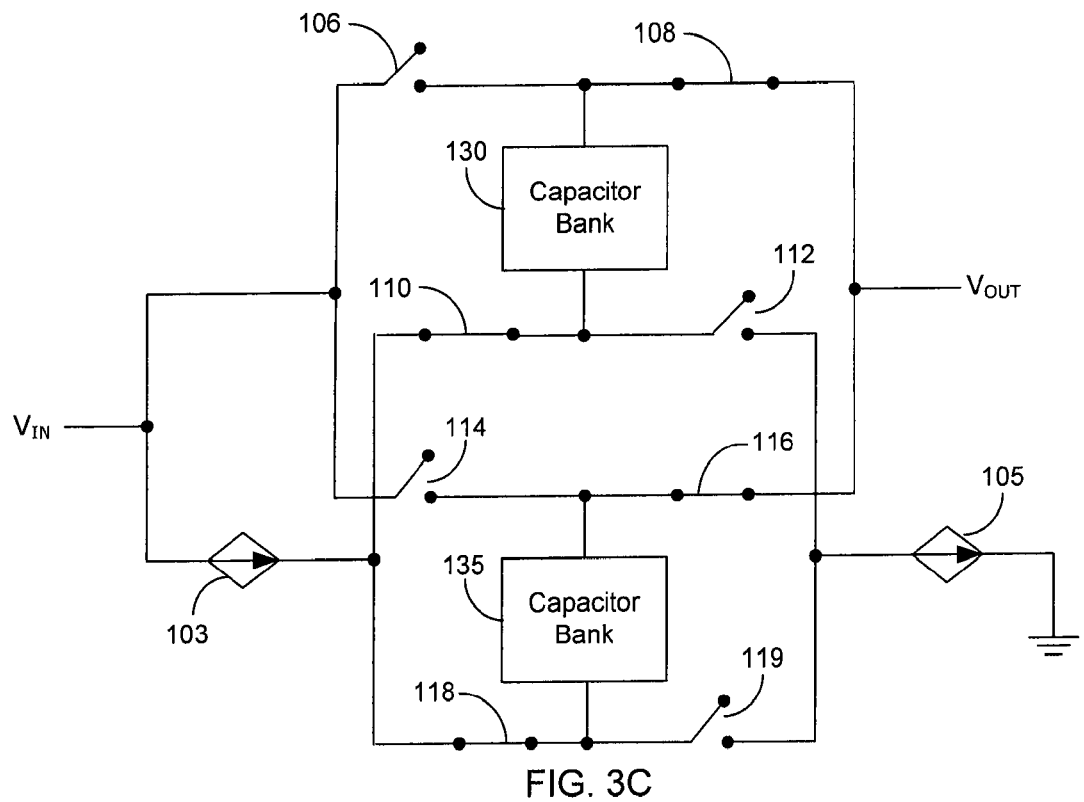
Figure 3D:
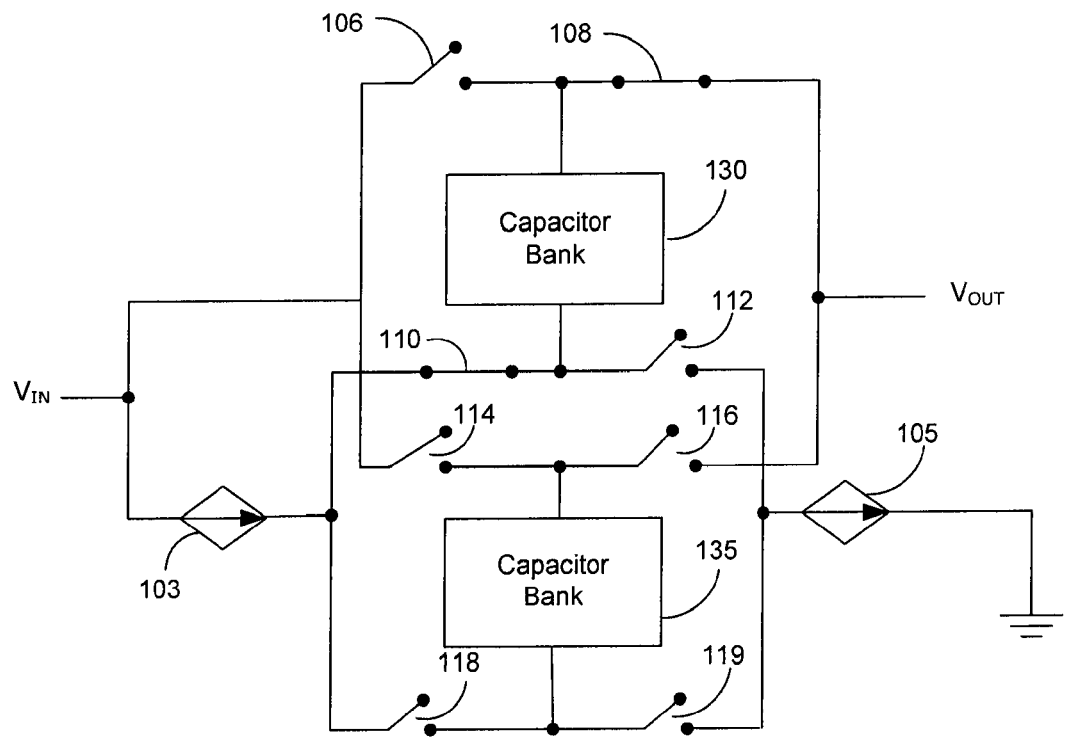

Next, after an appropriate time has passed, which may be based on the discharge rate of capacitor bank 135, circuit 100 begins its transition to phase 2 by way of transition states 1-3, which are depicted in FIGS. 3B-3D. For example, circuit 100 may transition from phase 1, to transition state 1, to avoid discharging capacitor bank 135 beyond a predetermined point.

Circuit 100 changes from phase 1 to transition state 1 by opening switches 106 and 112, which disconnects capacitor bank 130 from the remainder of circuit 100. This is shown in FIG. 3B. During this state, current continues to be supplied to $V_{OUT}$ by current source 103 and capacitor bank 135, maintaining the output current substantially constant. Moreover, because it is preferable that capacitor terminals in capacitor bank 130 are not connected to more than one voltage at the same time, there is a need for a period during which a given terminal is not connected to either voltage. For capacitor bank 130, this occurs during transition states 1 and 6. Furthermore, during transition state 1, the internals of capacitor bank 130 are changed from its charge configuration to its discharge configuration.

Next, circuit 100 changes from transition state 1 to transition state 2 by closing switches 108 and 110, which reconnects capacitor bank 130 to circuit 100 and specifically to $V_{OUT}$. This is shown in FIG. 3C. During this state, current continues to be supplied to $V_{OUT}$ by current source 103, although now it is being supplied through both capacitor banks 130 and 135. Because the current delivered to $V_{OUT}$ is being controlled by a single current source (103) it is possible to connect both capacitor banks without changing the terminal currents. This is an important transition state which allows capacitor bank 135 to be disconnected from circuit 100 (for subsequent charging) while maintaining the current flow path through capacitor bank 130 from current source 103. This provides a smooth transition that allows circuit 100 to reduce and/or avoid altogether current (or voltage) spikes that might otherwise occur when capacitor bank 130 is reconnected to $V_{OUT}$.

Circuit 100 changes from transition state 2 to transition state 3 by opening switches 118 and 116, which disconnects capacitor bank 135 from the remainder of circuit 100 (shown in FIG. 3D). During this state, current continues to be supplied to $V_{OUT}$ by current source 103 and capacitor bank 130. Thus, the current flow path from current source 103 to $V_{OUT}$ is maintained, which keeps the output current constant. Moreover, because capacitor terminals in capacitor bank 135 are preferably not connected to more than one voltage at the same time, it is desirable to have a period during which a given terminal is not connected to either voltage. For capacitor bank 135, this period occurs during transition states 3 and 4. During this period, the internals of capacitor bank 135 are changed from its discharge configuration to its charge configuration.

Figure 3E:
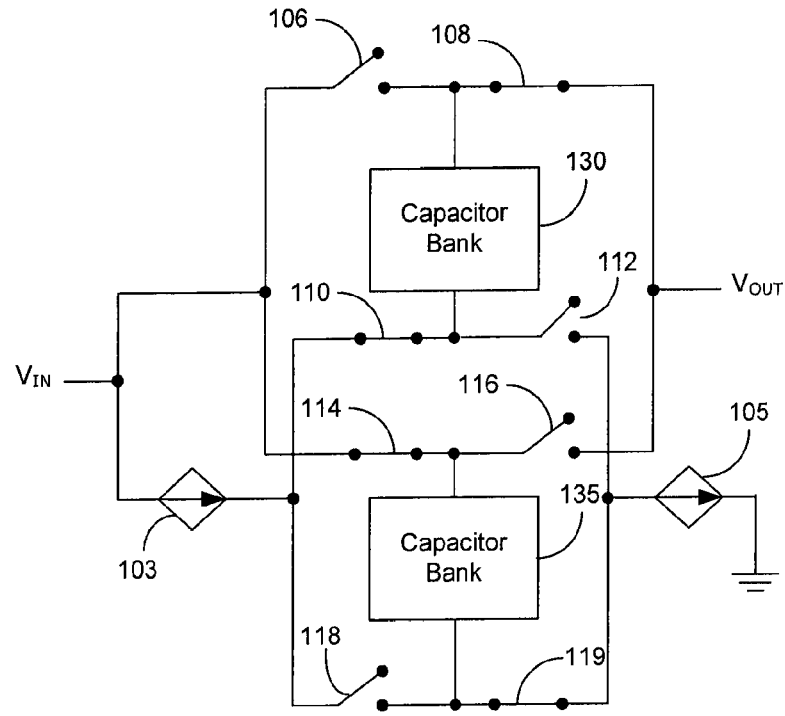

Circuit 100 changes from transition state 3 to phase 2 by closing switches 114 and 119, which connects capacitor bank 135 to $V_{IN}$ and current source 105. This is shown in FIG. 3E. With this configuration, current flows from $V_{IN}$, through source 103 and switch 110 to capacitor bank 130, which is discharging through switch 108 to $V_{OUT}$. In addition, current flows from $V_{IN}$, through switch 114, to capacitor bank 135, which is charging based on the current drawn by source 105 through switch 119. During phase 2, capacitor bank 135 is in its charging configuration, whereas capacitor bank 130 is in its discharge configuration.

Figure 3F:
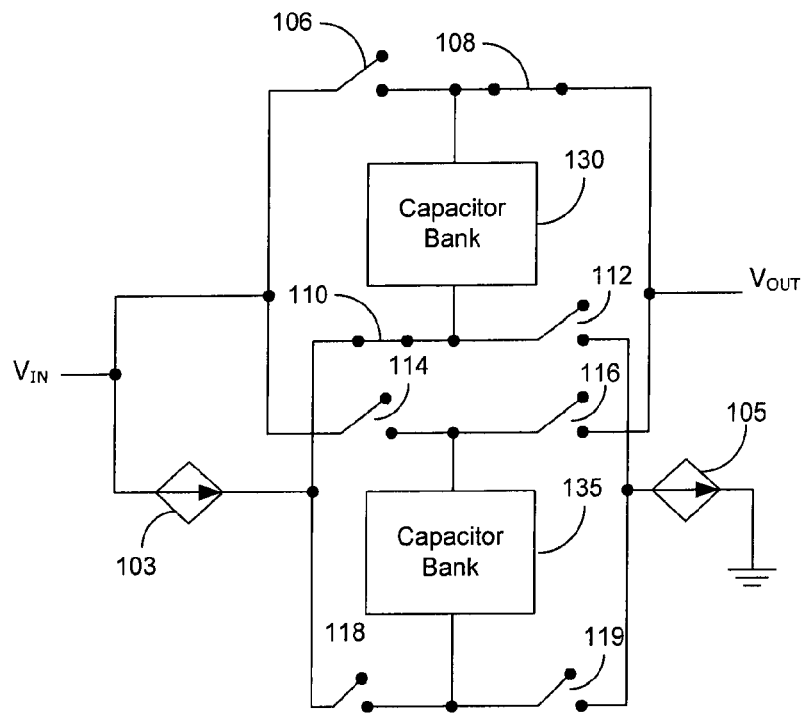
Figure 3G:
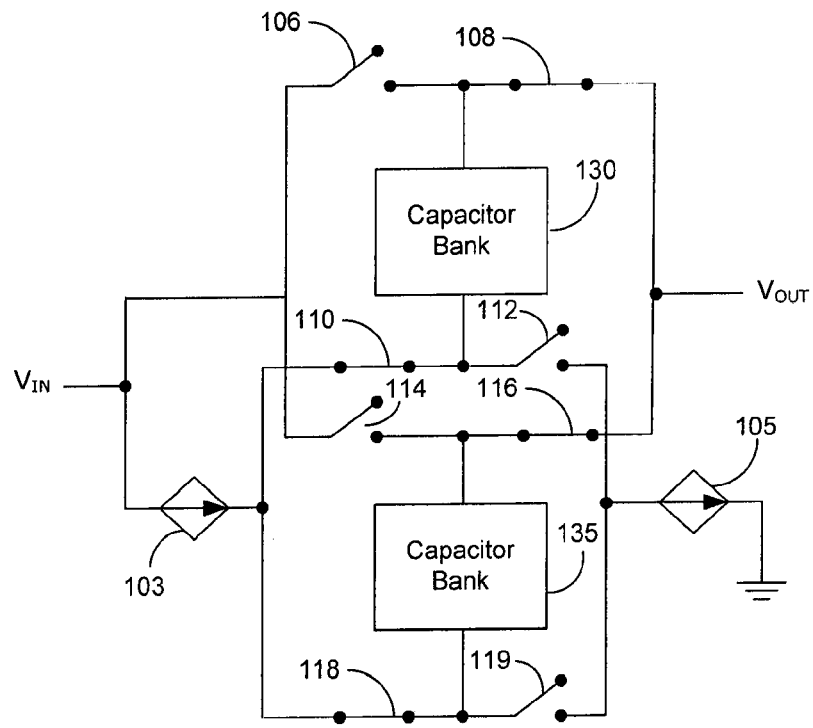
Figure 3H:
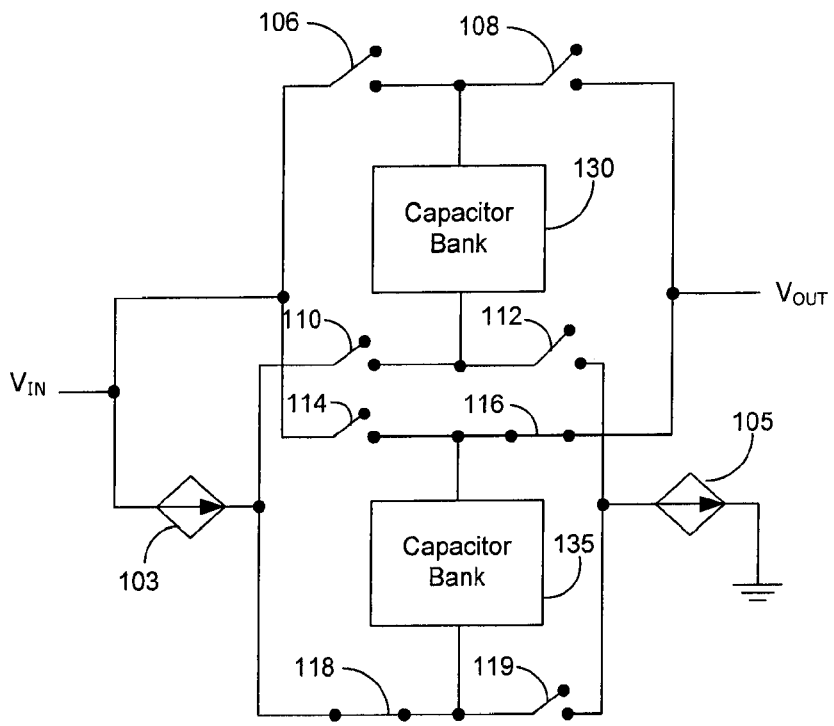

At this point, after an appropriate time has passed, which may be based on the discharge rate of capacitor bank 130, circuit 100 transitions back to phase 1 by way of transition states 4-6, which are depicted in FIGS. 3F-3H. For example, circuit 100 may transition from phase 2 to transition state 4 to avoid discharging capacitor bank 130 beyond a predetermined point.

Circuit 100 changes from phase 2 to transition state 4 by opening switches 114 and 119, which disconnects capacitor bank 135 from the remainder of circuit 100 (shown in FIG. 3F). During this state, current continues to be supplied to $V_{OUT}$ by current source 103 and capacitor bank 130. This maintains the current flow path from current source 103 to $V_{OUT}$, which keeps the output current constant. During this period, the internals of capacitor bank 135 should be changed from its charge configuration to its discharge configuration.

Next, circuit 100 changes from transition state 4 to transition state 5 by closing switches 118 and 116, which reconnects capacitor bank 135 to circuit 100 and specifically to $V_{OUT}$. This is shown in FIG. 3G. During this state, current continues to be supplied to $V_{OUT}$ by current source 103, although now it is being supplied by both capacitor banks 130 and 135. Because the current delivered to $V_{OUT}$ is being controlled by a single current source (103) it is possible to connect both capacitor banks without changing the terminal currents (both input and output). This is an important transition which allows capacitor bank 130 to be disconnected from circuit 100 (for subsequent charging) while maintaining the current flow path through capacitor bank 135 from current source 103. This provides a smooth transition and allows circuit 100 to reduce and/or avoid altogether current (or voltage) spikes that might otherwise occur when capacitor bank 135 is reconnected to $V_{OUT}$.

At this point, circuit 100 changes from transition state 5 to transition state 6 by opening switches 108 and 110, which disconnects capacitor bank 130 from the remainder of circuit 100. This is shown in FIG. 3H. During this state, current continues to be supplied to $V_{OUT}$ by current source 103 and capacitor bank 135. This maintains the current flow path from current source 103 to $V_{OUT}$, which keeps the output current constant. During this period, the internals of capacitor bank 130 should be changed from its discharge configuration to its charge configuration. Next, circuit 100 changes back to phase 1, and the cycle described above is repeated.

As mentioned above, current source 105 is used to replenish the charge on the capacitor banks 130 and 135. Accordingly, it is desirable to choose its value such that it is at least large enough to replace the charge lost during the rest of the cycle (during the capacitor's designated recharge period). The calculation of lost charge may account for changes in the charge/discharge configuration and associated charge/discharge time and rate. For example, if two capacitors are discharged in series for a time $t_1$ with current G1 (e.g., current source 103), and they are charged in parallel for a time $t_2$ with current G2 (e.g., current source 105), then G2 is given by equation 1:

$$G2 \geq 2 \frac{t_1}{t_2} G1, \qquad (1)$$

where the factor of 2 accounts for the series-to-parallel change. Assuming that current divides equally between capacitor banks 130 and 135 in transition states 2 and 5, and the timing is symmetric (i.e. the time spent in phase 1 is substantially the same as phase 2, transition state 1 is substantially the same as transition state 4, etc.), then time $t_1$ may be expressed as:

$$t_1 = t_{Phase1} + t_{state1} + t_{state6} + \frac{t_{state2} + t_{state5}}{2}, \qquad (2)$$

and $$t_2 = t_{Phase1}. \qquad (3)$$

Furthermore, as mentioned above, current source 105 preferably includes a voltage clamp circuit to maintain its voltage drop above a certain minimum level when sinking current to ground. Accordingly, during transition states 1-6, when one terminal of current source 105 is disconnected from the capacitors, it will naturally stop at the lowest level permitted by the voltage clamp, which shunts its current to $V_{IN}$. This is done to maintain the current from $V_{IN}$ constant (which is being drawn from $V_{IN}$ during phases 1 and 2). In certain specific implementations, current source 105 will have some minimum voltage across it below which its current is no longer constant, and it is desirable that the clamp voltage is chosen to be larger than this minimum value.

The voltage clamp also allows the selection of the current source 105 to be greater than the minimum value described above without impairing the operation of circuit 100. This allows for some variation in its operating parameters (and accordingly for component values which vary somewhat during circuit fabrication). During phase 1 and/or 2, if the value of current source 105 is larger than that required, its voltage will reach the clamp threshold and stop charging the capacitor banks before the end of the phase (i.e., more quickly than is required), but without affecting the current draw from $V_{IN}$.

Moreover, although it is desirable to choose the clamp voltage to be somewhat larger than the minimum required in order to a have constant output current from current source 105, in some embodiments it may be further desirable to have this value be as close to this minimum as possible, because the clamp voltage reduces the maximum amount of charge which can be stored on the capacitors, and thus the maximum attainable output voltage. However, when current source 105 is clamped, its current is wasted power, because it is used to keep the input current constant and not to charge or discharge a capacitor. In view of this condition, it may be desirable in certain embodiments to make the current level of source 105 as close to the minimum as possible (without going under), and minimize the amount of time that circuit 100 spends in transition states 1-6 (which will reduce the minimum current value), subject to the constraint that at some point faster switching may, due to other effects, cause substantial supply spikes by itself.

In some embodiments, circuit 100 may be further improved by replacing the switches directly connected to source 103 (switches 110 and 118) with switched current-passing elements which do not force capacitor banks 130 and 135 to have equal voltage during transition states 2 and 5. This allows the capacitor bank which is beginning to discharge (e.g., 130 in transition state 2) to retain more of its charge and maintain a higher voltage in its discharge phase (e.g., phase 2 for bank 130). This may be accomplished by appropriate modification of the control signal for an active switch or by using suitable biasing techniques (e.g., to maintain a MOSFET in its saturation region instead of its triode region, etc.).

Figure 4:
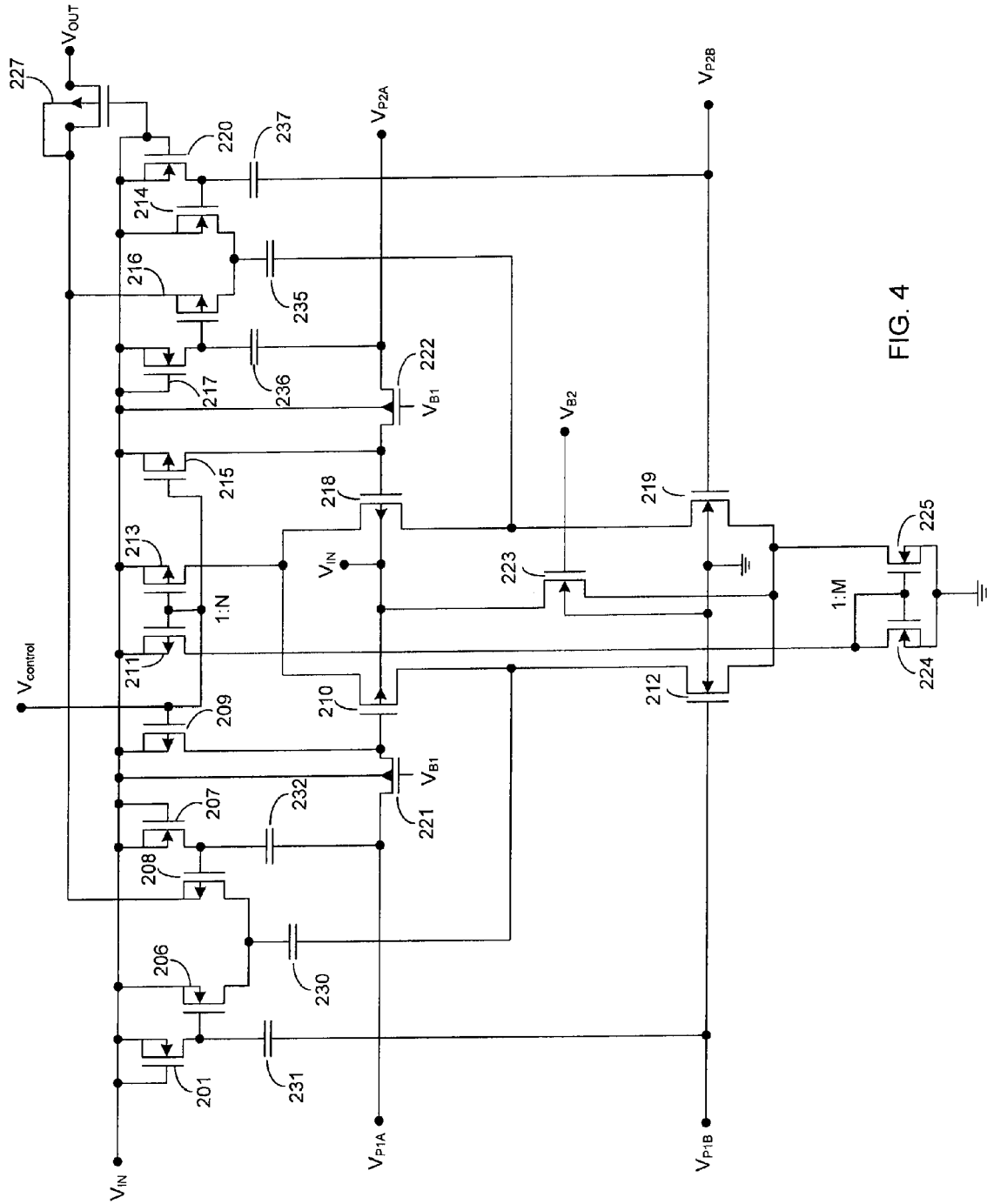
FIG. 4 is a schematic diagram of one possible specific semiconductor implementation of the charge pump circuit shown in FIG. 1.

One possible specific implementation of charge pump circuit 100 is shown in FIG. 4 as charge pump circuit 200. Circuit 200 is a semiconductor based implementation which includes NMOS transistors 201, 206-207, 212, 214, 217, 219-220 and 223-225, PMOS transistors 208-211, 213, 215-216, 218, 221-222 and 227 and capacitors 230-232 and 235-237.

Charge pump 200 is similar in many respects to the charge pump shown in FIG. 1 and generally includes components and functional blocks which have been numbered similarly to denote similar functionality and general correspondence. For example, charge pump 200 includes switches 206, 208, 210, 212, 214, 216, 218 and 219 (transistors 206, 208, 210, 212, 214. 216, 218 and 219 in FIG. 4), and capacitors 230 and 235. Moreover, charge pump circuit 200 operates substantially similarly to charge pump circuit 100 described above.

As shown in FIG. 4, circuit 200 includes capacitors 230 and 235 which allows circuit 200 to generate a maximum voltage at $V_{OUT}$ of slightly less than $2V_{IN}$ (dependent on the biasing details, as discussed below). As in FIG. 1, circuit 200 employs the charging/discharging current sources in the same relative locations (as opposed to the alternate locations represented by sources 102 and 104) because it simplifies the implementation in that neither of the switched current sources is exposed to a voltage outside the range of ground-to-$V_{IN}$.

The discharging current source (referred to as source 103 in FIG. 1) is implemented as PMOS transistor 213, and its output current is controlled by the voltage level of control signal $V_{control}$. NMOS transistor 225 mirrors the current established by PMOS transistor 211, and functions as the charging current source (source 105 in FIG. 1).

The relationship of N to M for the current mirrors formed by PMOS transistors 211 and 213 (N) and NMOS transistors 224 and 225 (M) is chosen based on the fraction of the cycle time that the circuit 200 spends in transition states. Choosing N>>1 will minimize the power lost in setting up this bias. The current-shunting clamp described above in connection with source 105 is implemented by NMOS transistor 223, whose gate is biased by an appropriate voltage given by equation 4:

$$V_{B2} \geq V_{GS,223} + V_{DSsat,225} \qquad (4)$$

which maintains NMOS transistor 225 substantially out of the triode region of operation and thus keeps its output current constant.

Figure 5:
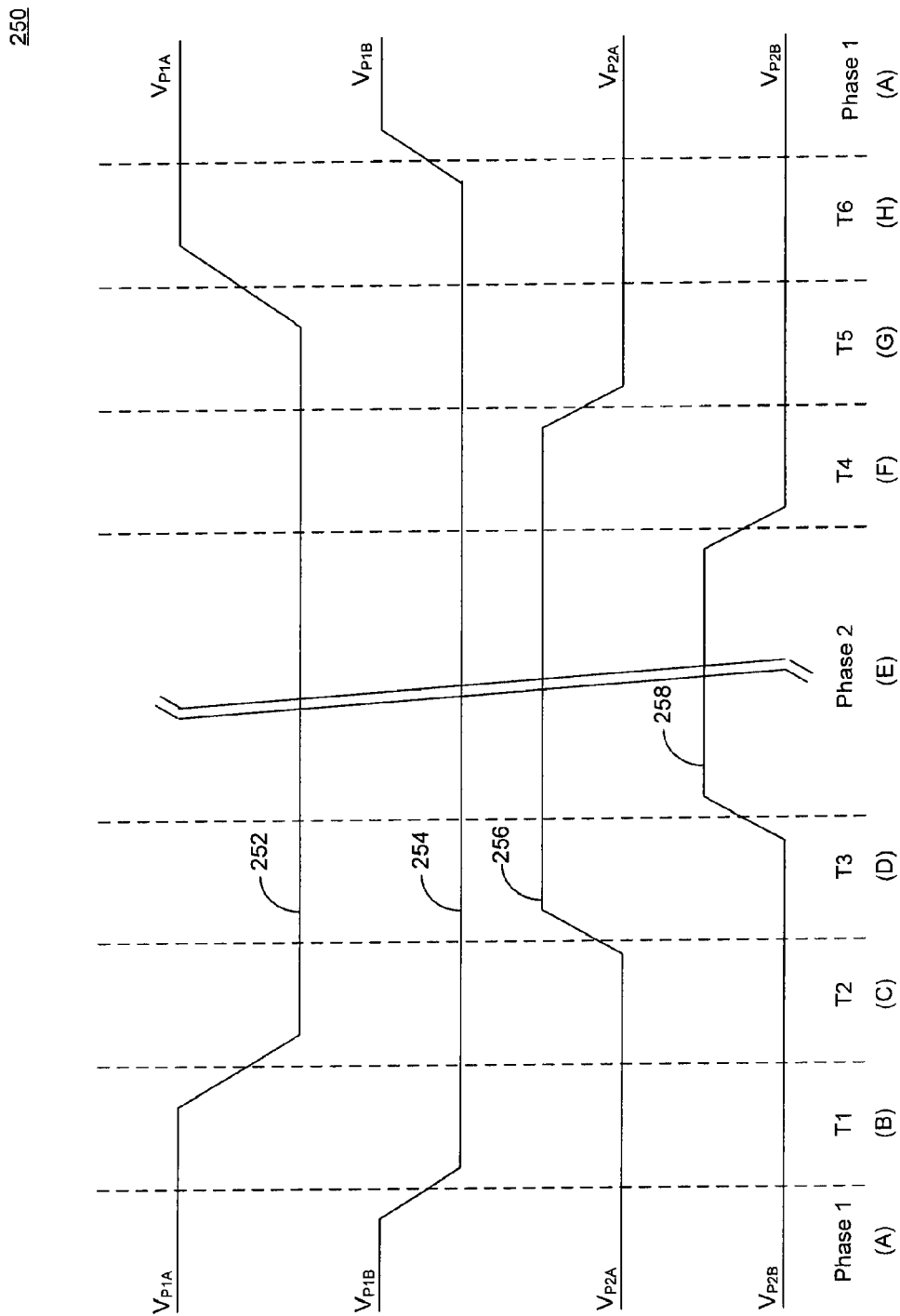
FIG. 5 is a timing diagram illustrating some of the clock signals that control the switching of the charge pump circuit shown in FIG. 4.

Control of the transistors in circuit 200 is accomplished by external clock signals which, in some embodiments, may range in value from zero volts to $V_{IN}$. The external clock signals may be applied to the control lines designated $V_{P1A}$, $V_{P1B}$, $V_{P2A}$, and $V_{P2B}$ in FIG. 4. The timing of these clock signals, and how they relate to the state and phase transitions described in FIG. 3 are shown in FIG. 5, which is discussed in more detail below.

Capacitors 231, 232, 236, and 237, are associated with diode-connected NMOS transistors 201, 207, 217, and 220, respectively. These transistors boost the voltage of the gate drive signals to transistors 206, 208, 216, and 211 such that they swing between the range defined by $V_{IN}-V_{GS}$ and $2V_{IN}-V_{GS}$, which allows PMOS transistors 208 and 216 to turn OFF, and NMOS transistors 206 and 214 to turn ON with negligible voltage drop (which increases the charge delivered during charging phase, and therefore the maximum sustainable $V_{OUT}$ voltage).

Furthermore, PMOS transistors 209, 215, 221 and 222, level shift the $V_{P1A}$ and $V_{P2A}$ clock signals to swing between range defined by $V_{B1}+V_{GS}$ on the low end and $V_{IN}$ on the high end. This provides the efficient current-passing switch behavior described above. That is, if control voltage $V_{B1}$ is chosen to be near $V_{IN}$, PMOS transistors 210 and 218 remain in saturation instead of moving into the triode region, so the lower plates of capacitors 230 and 235 are not forced to the same voltage.

More specifically, in some embodiments, control voltage $V_{B1}$ should be chosen as close to $V_{IN}$ as possible without reducing the output current of PMOS transistor 213. This value is approximately given by equation 5 below:

$$V_{B1} = V_{IN} - V_{DSsat,213} - V_{GS,210} - V_{GS,221} \quad (5)$$

Generally speaking, the operation of charge pump circuit 200 does not depend on "fast edges" on any of the gate drive signals. If it is desirable to keep the edge rates low to minimize or eliminate the supply disturbances due to the clock signals, this may be done without adversely affecting the operation of charge pump circuit 200.

From the operating parameters described above, it is possible to determine the maximum sustainable output voltage at $V_{OUT}$ under load. For example, if $V_{B1}$ and $V_{B2}$ are chosen as their optimal values given above, and the clock signals are timed such that the transition states are not a significant fraction of the total cycle time $t_{cycle}$, then the maximum value of $V_{OUT}$ may be defined by equation 6:

$$V_{OUT,max} = 2V_{IN} - V_{DSsat,213} - V_{DSsat,210} - V_{DSsat,225} - \frac{t_{cycle} I_{OUT}}{2C_1} \quad (6)$$

where C1 is the value of capacitor 230 and wherein the value of capacitor 235 is selected to be equal to capacitor 230.

Thus equation 6 defines the value which should be chosen for capacitor 230 (and 235), on the basis of the worst case requirements of $V_{OUT}$ and $I_{OUT}$. Faster cycle times will allow smaller capacitor values, but external switching transients will occur more quickly, and this may increase the external disturbance of $V_{IN}$ or $V_{OUT}$.

In addition, PMOS transistor 227 allows $V_{OUT}$ to drop below $V_{IN}$ and still have circuit 200 function correctly. If $V_{OUT}<V_{IN}$, NMOS transistor 227 acts as a cascode of the output current, keeping its source above $V_{IN}$ by $V_{GS}$. As $V_{OUT}$ rises above $V_{IN}$, NMOS transistor 227 enters triode and becomes a small resistor between the charge pump output and $V_{OUT}$. The voltage drop in this resistor represents a loss to the maximum sustainable output voltage $V_{OUT}$, so NMOS transistor 227 should be selected accordingly.

Turning now to FIG. 5, a timing diagram 250 is shown which illustrates the logic levels associated with the clock signals that control the switching of transistors in charge pump circuit 200. As shown, clock signal 252 ($V_{P1A}$) begins as a logic high signal during phase 1, begins transition state 1 (designated T1 in FIG. 5) as a logic high, but starts change to a logic low at the end of T1 and reaches a logic low at the beginning of transition state 2 (designated T2 in FIG. 5). This causes PMOS transistors 208 and 210 to turn ON. Control signal 252 remains a logic low through the rest of T2, transition state 3 (designated T3 in FIG. 5), phase 2, transition state 4 (designated T4 in FIG. 5) and begins to change to a logic high at the end of transition state 5 (designated T5 in FIG. 5) and reaches a logic high during transition state 6 (designated T6 in FIG. 5) and remains at a logic high until T1 is reached again. The transition at T6 causes PMOS transistors 208 and 210 to turn OFF.

Clock signal 254 ($V_{P1B}$) begins as a logic high signal during phase 1, but starts to change to a logic low at the end of phase 1 and reaches a logic low at the beginning of T1. This causes NMOS transistors 206 and 212 to turn OFF. Control signal 254 remains a logic low through the rest of T1 and remains a logic low until it reaches T6. At then end of T6, it begins to change to a logic high and reaches a logic high during phase 1 and remains at a logic high until T1 is reached again. The transition at phase 1 causes NMOS transistors 206 and 212 to turn ON.

Clock signal 256 ($V_{P2A}$) begins as a logic low signal during phase 1, but starts to change to a logic high at the end of T2 and reaches a logic high at the beginning of T3. This causes PMOS transistors 216 and 218 to turn OFF. Control signal 256 is a logic high through the rest of T3 and remains a logic high until it reaches T4. At the end of T4, it begins to change to a logic low and reaches a logic low during T5 and remains at a logic low until T2 is reached again. The transition at T5 causes PMOS transistors 216 and 218 to turn ON.

Clock signal 258 ($V_{P2B}$) begins as a logic low signal during phase 1, and remains as a logic low until it reaches T3 where it starts to change to a logic high and reaches a logic high at the beginning of phase 2. This causes NMOS transistors 214 and 219 to turn ON. Control signal 258 remains a logic high until the end of phase 2, at which point it begins to change to a logic low. Control signal 258 becomes a logic low at the beginning of T4 and remains at a logic low until it reaches phase 2 again. The transition at the end of phase 2 causes NMOS transistors 214 and 219 to turn OFF.

Figure 6:
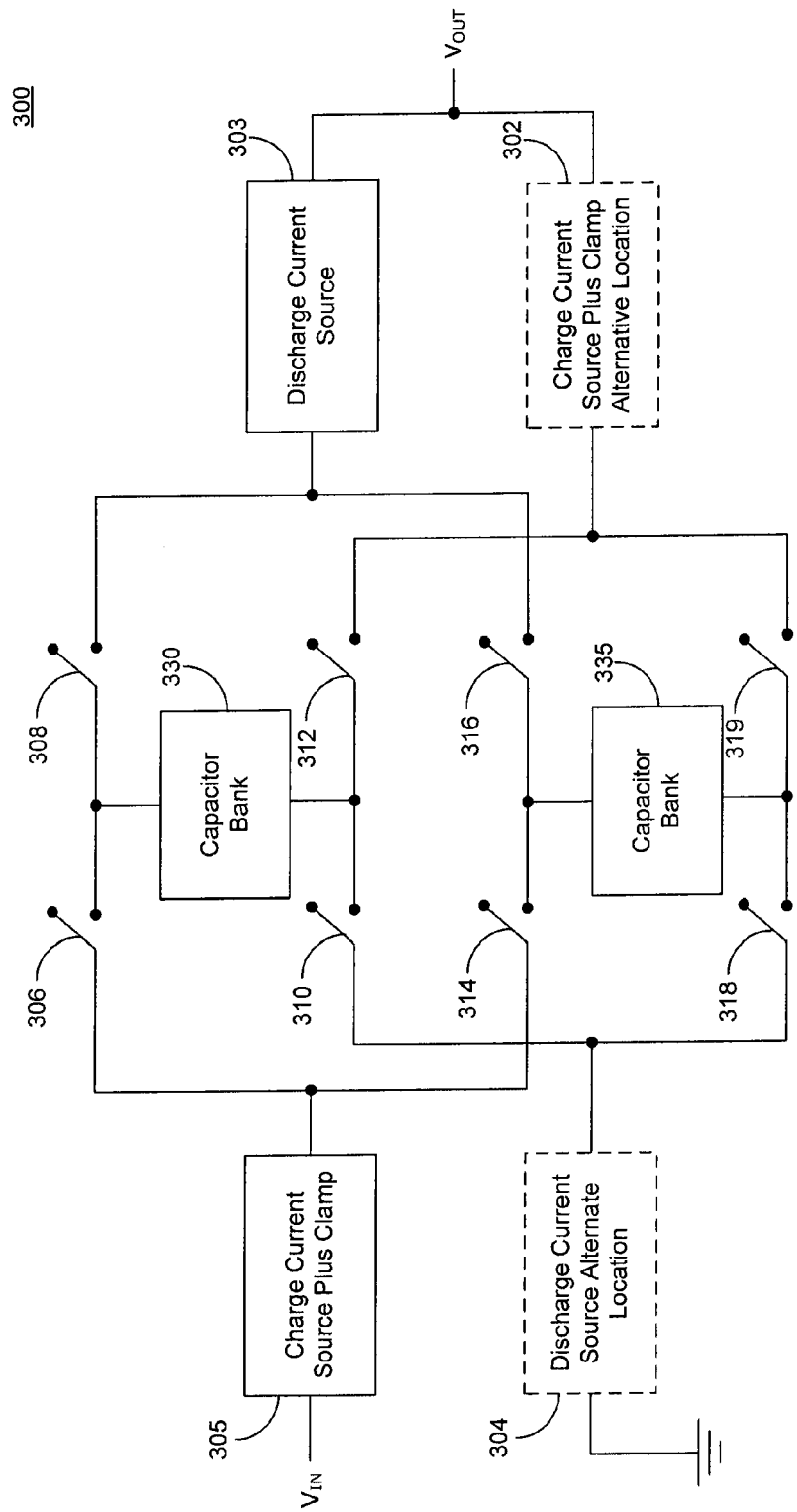
FIG. 6 is a generalized block diagram of one embodiment of a charge pump circuit suitable for providing a stepped down output voltage constructed in accordance with the principles of the present invention.

A general block diagram of another embodiment of a charge pump circuit constructed in accordance with the principles of present invention is shown in FIG. 6. This configuration is suitable for providing a reduced voltage, which when coupled with regulation circuitry, provides a stepped down regulated voltage (i.e., is used in constructing a buck converter). As shown, circuit 300 may generally include current sources 303 and 305, switches 306-319, and capacitor banks 330 and 335. In some embodiments, circuit 300 may be configured to include alternate current sources 302 and 304 rather than sources 303 and 305 (as indicated by the dotted lines).

Generally speaking, either current sources 303 and 305 are used, or sources 302 and 304, but not both (i.e., only two are used). Embodiments using current sources 302 and 303 may be used if desired, as well as embodiments using current sources 304 and 305. The selection of current source 302 or 305 may be made independent of the selection of current sources 303 or 304 and vice versa. Embodiments using current sources 303 and 305 are described below for simplicity. It will be understood, however, that embodiments using other current sources may be used if desired using the principles further described herein.

In operation, charge pump circuit 300 may draw a substantially constant input current at $V_{IN}$ and provide a substantially constant output current at $V_{OUT}$. Current spikes at the switching intervals are reduced or substantially eliminated. One way this is may be accomplished is by controlling switches 306-319 such that current source 303 has an uninterrupted current flow path through capacitors 330 or 335 from ground to $V_{OUT}$. Circuit 300 may operate in two (or more) phases such that capacitors 330 charge while capacitors 335 discharge and vice versa. With the configuration shown in FIG. 6, current source 303 is responsible for discharging capacitors 330 and 335, whereas current source 305 is responsible for charging capacitors 330 and 335 (described in more detail below in connection with FIG. 7).

Switches 306-319 shown in FIG. 6 may be physically implemented in numerous ways. For example, switches 306-319 may be implemented as any suitable type of armature or semiconductor based switch. Moreover, in some embodiments current sources 303 and 305 may be controlled or programmable current sources rather than fixed current sources. For example, circuit 300 may contain sensing circuitry (not shown) which adjusts the current level based on certain external conditions such as the input voltage or current provided at $V_{IN}$ or the current or voltage level present (or required) at $V_{OUT}$. Circuit 300 may further interface with or include circuitry for establishing the current level of current sources 303 and 305 such as external digital control signals, or include programmable memory circuits for that may be programmed to establish current level (not shown).

Additionally, current source 305 preferably includes voltage clamp circuitry to prevent its voltage from dropping below a desirable level by shunting current to $V_{OUT}$ (or to $V_{IN}$ in embodiments using alternate source 302). During transition between operating phases, current source 305 experiences periods during which it is not connected to capacitor banks 330 or 335, and the clamp circuitry provides a current flow path for the source during that time, which maintains the input and output current substantially constant. During these transition states, current is delivered from $V_{IN}$ to $V_{OUT}$ through the voltage clamp (not shown).

If the clamp circuitry is included in current source 305, the input and output current of the circuit is maintained through the transition period at a level substantially the same as it is in other phases. This ensures that the total input and output current is maintained substantially constant throughout the operation of the charge pump, because the current flow path from $V_{IN}$ to $V_{OUT}$ continuously passes through current source 305, and that from ground to $V_{OUT}$ passes continuously through source 303. It will be understood, however, that in alternate embodiments, any other suitable circuitry may be used to maintain the currents substantially constant, if desired.

Capacitor banks 330 and 335 may be configured as capacitor bank 150 as described above (shown in FIG. 2). However, any suitable configuration may be used if desired.

Referring now back to FIG. 6, circuit 300 may be used to step down the value of the voltage provided at $V_{IN}$ and provide a substantially constant output current with current spikes at the switching intervals minimized or substantially eliminated. As mentioned above, circuit 300 generally operates in two phases, referred to herein as phase 1 and phase 2. During phase 1, capacitor bank 335 is coupled to current source 303 and ground, causing it to discharge and provide current through source 303 to $V_{OUT}$. Concurrently, capacitor bank 330 is coupled to $V_{OUT}$ and current source 305 causing it to be charged by current delivered to $V_{OUT}$ by source 305. Accordingly, during phase 1, capacitor bank 330 is placed in its charging configuration, whereas capacitor bank 335 is in its discharge configuration.

Next, after several transition phases, circuit 300 reaches phase 2 during which capacitor bank 330 is coupled to current source 303 and ground, causing it to discharge and provide current through source 303 to $V_{OUT}$. Concurrently, capacitor bank 335 is coupled to $V_{OUT}$ and current source 305, which causes it to be charged by current delivered to $V_{OUT}$ by source 305. During phase 2, capacitor bank 335 is placed in its charging configuration, whereas capacitor bank 330 is in its discharge configuration. This cycle is repeated, and circuit 300 produces a stepped down output voltage with substantially constant input and output current.

The current produced by current source 303 should be selected (or controlled) to be substantially constant and related to the desired (or required) output current of circuit 300. This allows circuit 300 to provide a substantially constant output current through capacitor banks 330 and 335. Source 305 needs to be large enough to replace the charge lost on capacitor banks 330 and 335 during the rest of the switching cycle and provide the remainder of the output current. Source 305 should also be configured such that it is substantially constant to maintain the input and output currents substantially constant.

Turning now to FIGS. 7A-7H, a more detailed depiction of circuit 300 and its various phases of operation and transition states is shown. Initially, assume circuit 300 begins in phase 1 of operation (which may occur after a brief initialization phase, during which a minimum amount of charge is imparted to capacitor banks 330 and 335 (e.g., by connecting capacitor banks 330 and 335 to current source 305)).

Figure 7A:
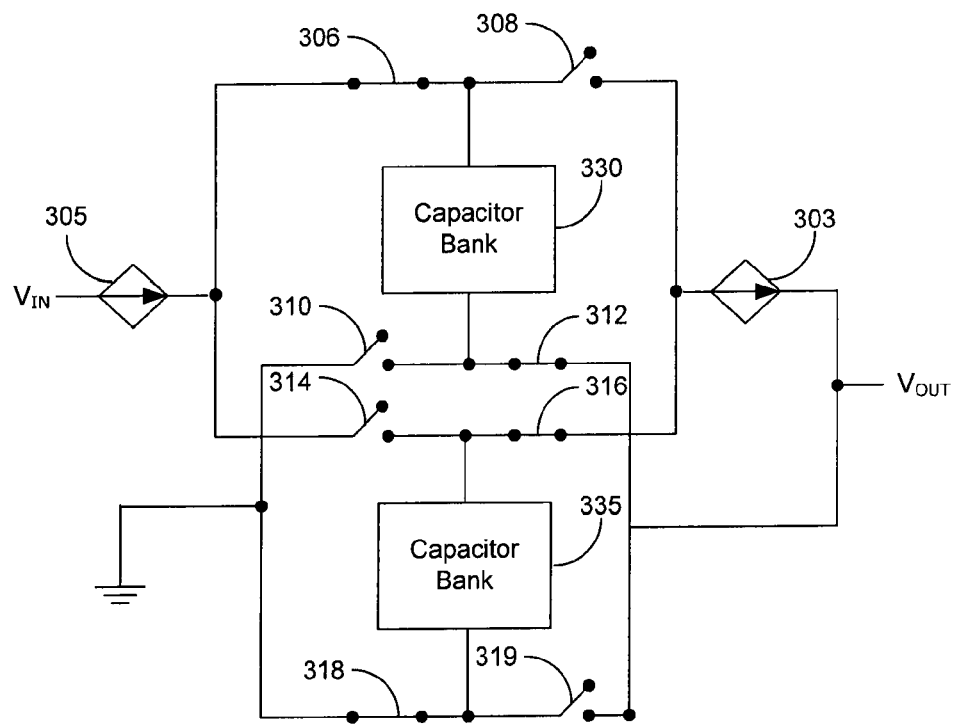
FIGS. 7A-7H are block diagrams illustrating the various states of operation of the charge pump circuit of FIG. 6.

At this point, switches 306, 312, 316 and 318 are closed, with the remainder of the switches open. This is shown in FIG. 7A. Using this configuration, current flows from ground through capacitor bank 335 and switch 316 to source 303 and then to $V_{OUT}$. Current also flows from $V_{IN}$ to current source 305, through capacitor bank 330 and switch 312 to $V_{OUT}$. As mentioned above, the total value of current source 303 and 305 is selected to substantially match the desired output current. As a result, the output current at $V_{OUT}$ matches this current value. During phase 1, capacitor bank 330 is in its charge configuration and capacitor bank 335 is in its discharge configuration.

Figure 7B:
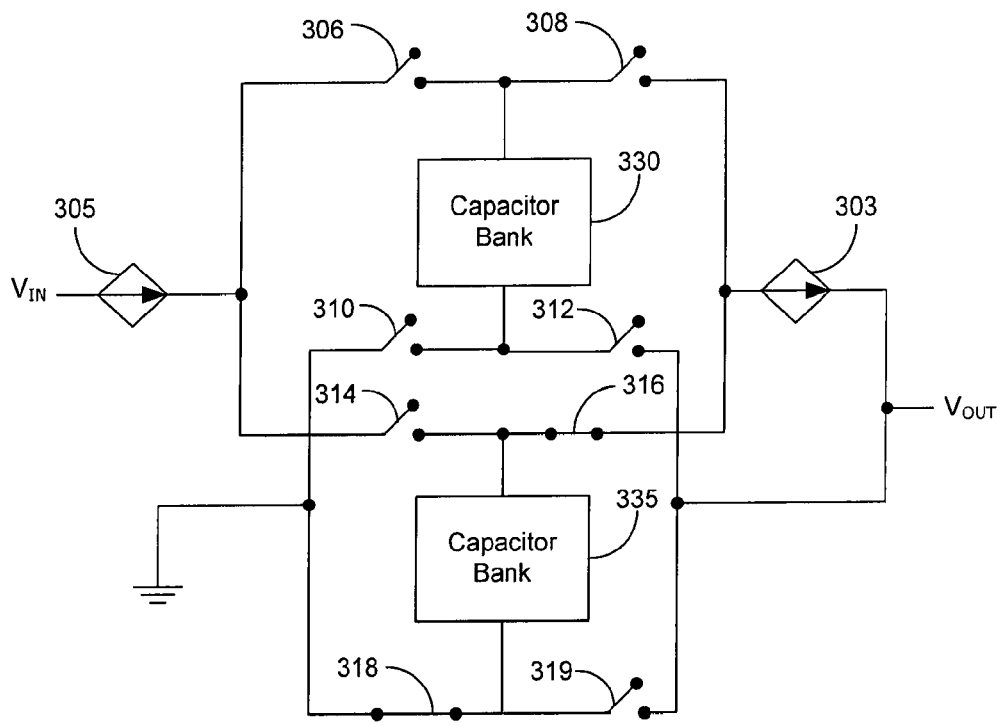
Figure 7C:
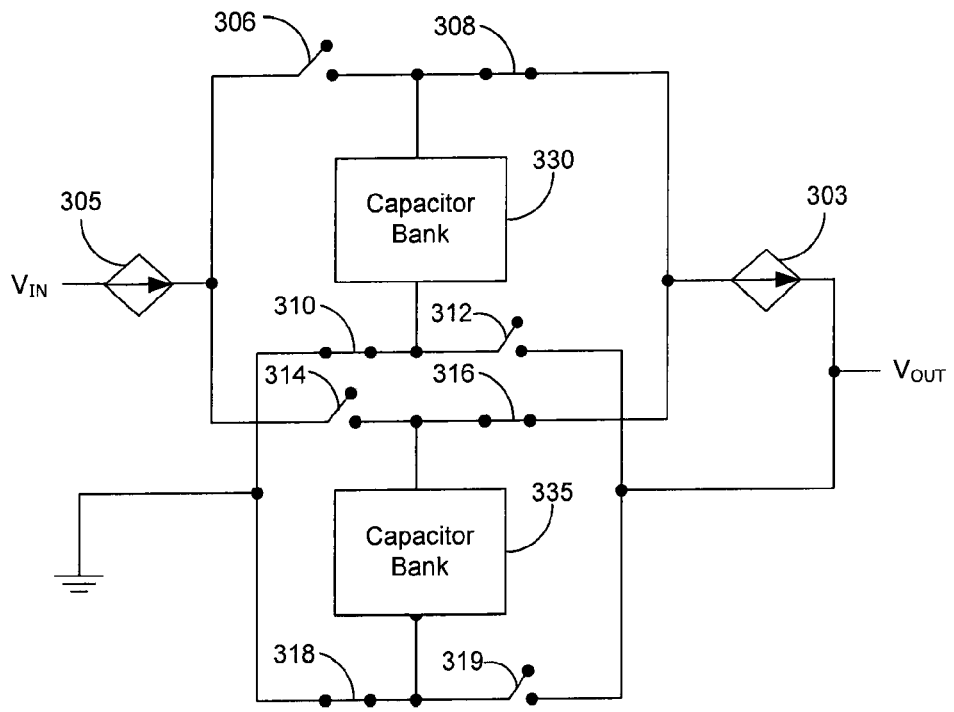
Figure 7D:
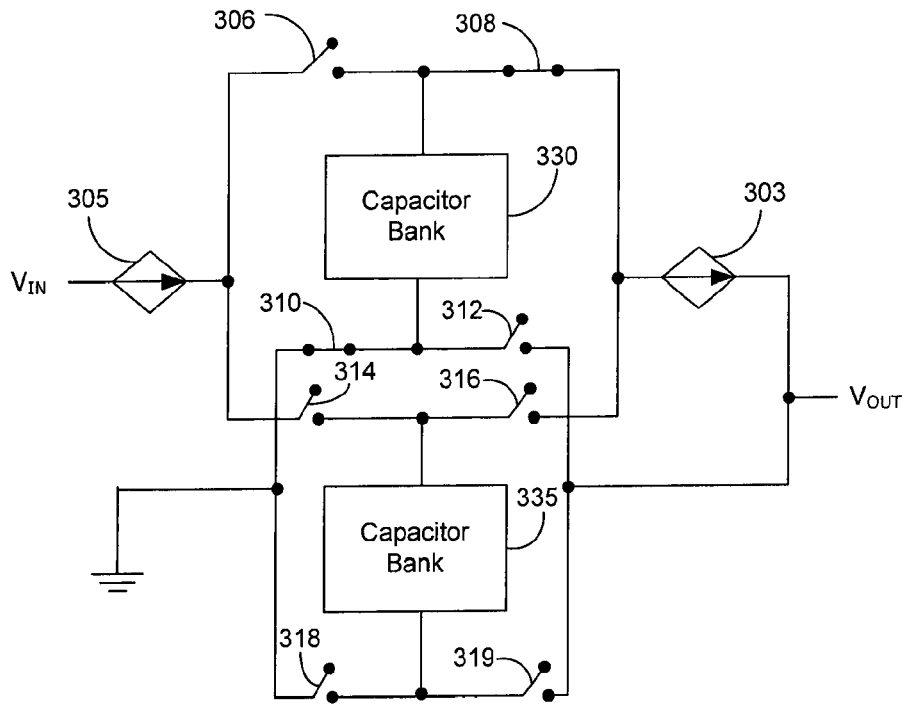

Next, after an appropriate time has passed, which may be based on the discharge rate of capacitor bank 335, circuit 300 begins its transition to phase 2 by way of transition states 1-3, which are depicted in FIGS. 7B-7D. For example, circuit 300 may transition from phase 1, to transition state 1, to avoid discharging capacitor bank 335 beyond a predetermined point.

Circuit 300 changes from phase 1 to transition state 1 by opening switches 306 and 312, which disconnects capacitor bank 330 from the remainder of circuit 300. This is shown in FIG. 3B. During this state, current continues to be supplied to $V_{OUT}$ by current source 303 and capacitor bank 335 and through the clamp coupled to current source 305, maintaining the output current substantially constant. Moreover, because capacitor terminals in capacitor bank 330 are preferably not connected to more than one voltage at the same time, it is desirable to have a period during which a given terminal is not connected to either voltage. For capacitor bank 330, this occurs during transition states 1 and 6. Furthermore, during transition states 1-6, current from current source 305 is delivered from $V_{IN}$ to $V_{OUT}$ through a voltage clamp circuit (not shown). During transition state 1, capacitor bank 330 is internally reconfigured from its charge to its discharge configuration.

Next, circuit 300 changes from transition state 1 to transition state 2 by closing switches 308 and 310, which reconnects capacitor bank 330 to circuit 300 and specifically to $V_{OUT}$ (shown in FIG. 7C). During this state, current continues to be supplied to $V_{OUT}$ by current source 303, although now it is being supplied through both capacitor banks 330 and 335. Because the current delivered to $V_{OUT}$ is being controlled by a single current source (303) it is possible to connect both capacitor banks without changing the terminal currents (both input and output). This is an important transition state which allows capacitor bank 335 to be disconnected from circuit 300 (for subsequent charging) while maintaining the current flow path through capacitor bank 330 from current source 303. This provides a smooth transition that allows circuit 300 to reduce and/or avoid altogether current (or voltage) spikes that might otherwise occur when capacitor bank 330 is reconnected to $V_{OUT}$.

Circuit 300 changes from transition state 2 to transition state 3 by opening switches 318 and 316, which disconnects capacitor bank 335 from the remainder of circuit 300. This is shown in FIG. 7D. During this state, current continues to be supplied to $V_{OUT}$ by current source 303 and capacitor bank 330 and through the clamp coupled to current source 305. Thus, the current flow path from current sources 303 and 305 to $V_{OUT}$ is maintained, which keeps the output current constant. Moreover, because capacitor terminals in capacitor bank 335 are preferably not connected to more than one voltage at the same time, it is desirable to have a period during which a given terminal is not connected to either voltage. For capacitor bank 335, this period occurs during transition states 3 and 4. During this period, the internals of capacitor bank 335 are changed from its discharge configuration to its charge configuration.

Figure 7E:
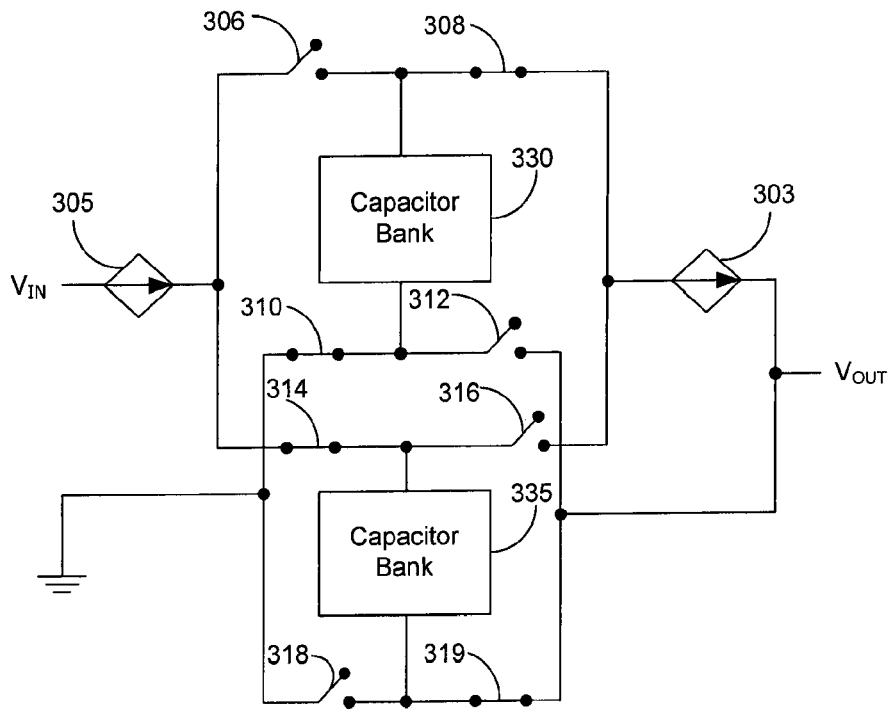

Circuit 300 changes from transition state 3 to phase 2 by closing switches 314 and 319, which connects capacitor bank 335 to $V_{OUT}$ and current source 305. This is shown in FIG. 7E. With this configuration, current flows from ground and switch 310 to capacitor bank 330, which is discharging through current source 303 to $V_{OUT}$. In addition, current flows from $V_{IN}$, through source 305 and switch 314, to capacitor bank 335, which is charging based on the current delivered to $V_{OUT}$ by source 305 through switch 319. During phase 2, capacitor bank 335 is in its charging configuration, whereas capacitor bank 330 is in its discharge configuration.

Figure 7F:
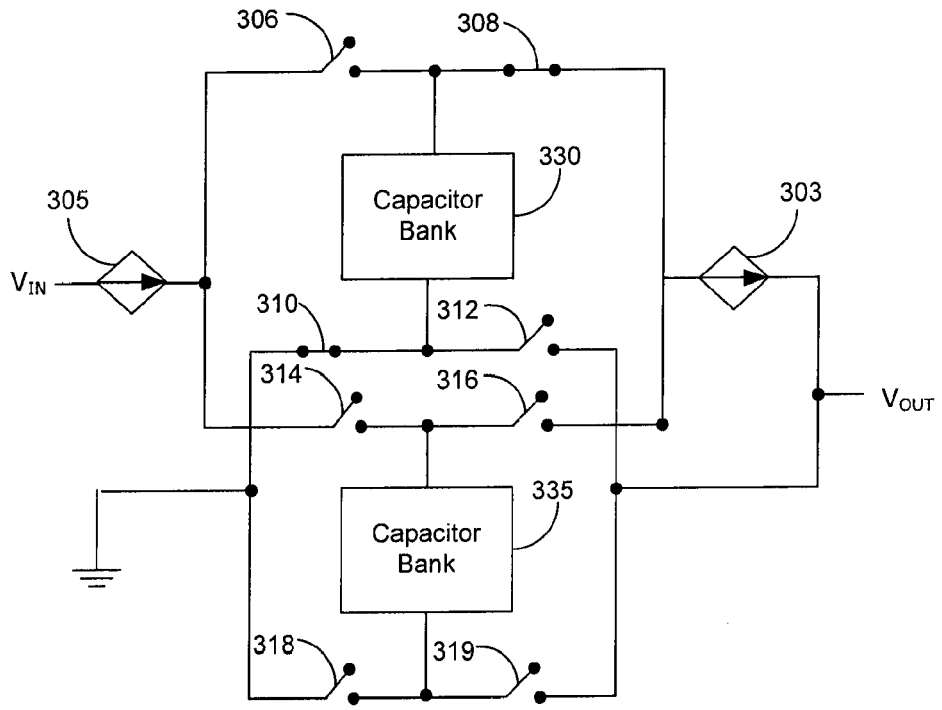
Figure 7G:
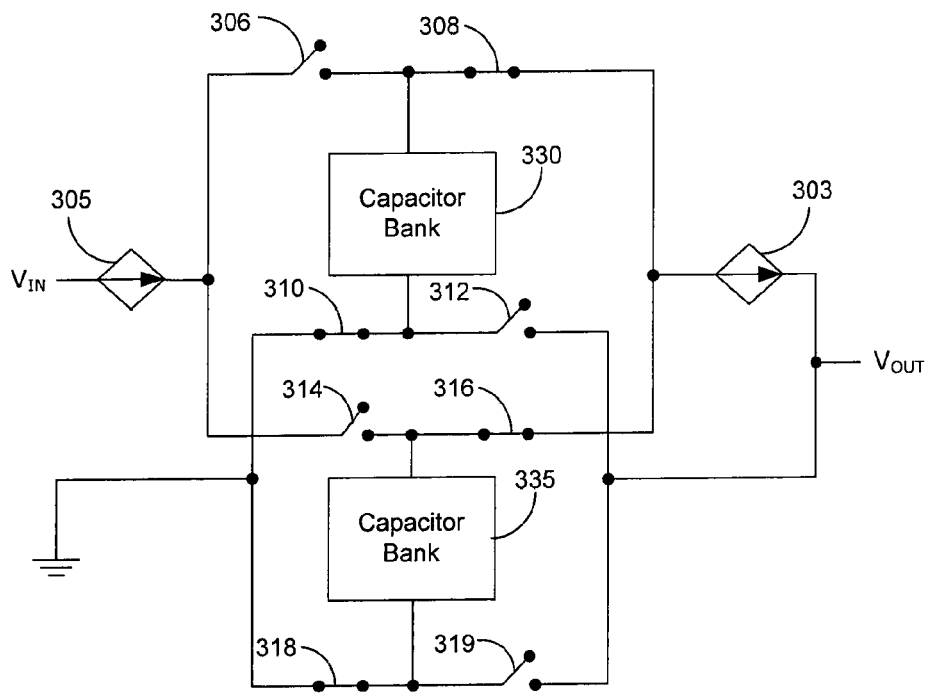
Figure 7H:
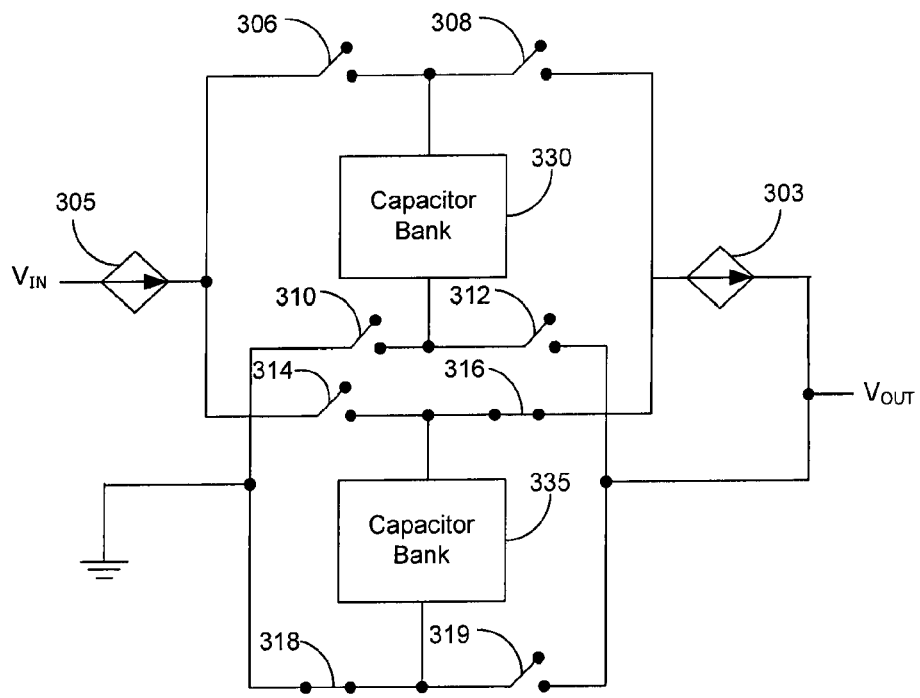

At this point, after an appropriate time has passed, which may be based on the discharge rate of capacitor bank 330, circuit 300 transitions back to phase 1 by way of transition states 4-6, which are depicted in FIGS. 7F-7H. For example, circuit 300 may transition from phase 2 to transition state 4 to avoid discharging capacitor bank 330 beyond a predetermined point.

Circuit 300 changes from phase 2 to transition state 4 by opening switches 314 and 319, which disconnects capacitor bank 335 from the remainder of circuit 300. This is shown in FIG. 7F. During this state, current continues to be supplied to $V_{OUT}$ by current source 303 and capacitor bank 330. This maintains the current flow path from current source 303 to $V_{OUT}$, which keeps the output current constant. During this period, the internals of capacitor bank 335 should be changed from its charge configuration to its discharge configuration.

Next, circuit 300 changes from transition state 4 to transition state 5 by closing switches 318 and 316, which reconnects capacitor bank 335 to circuit 300 and specifically to $V_{OUT}$ (shown in FIG. 7G). During this state, current continues to be supplied to $V_{OUT}$ by current source 303, although now it is being supplied by both capacitor banks 330 and 335. Because the current delivered to $V_{OUT}$ is being controlled by substantially continuously connected current sources (303 and 305) it is possible to connect both capacitor banks without changing the terminal currents (both input and output). This is an important transition which allows capacitor bank 330 to be disconnected from circuit 300 (for subsequent charging) while maintaining the current flow path through capacitor bank 335 from current source 303. This provides a smooth transition and allows circuit 300 to reduce and/or avoid altogether current (or voltage) spikes that might otherwise occur when capacitor bank 335 is reconnected to $V_{OUT}$.

At this point, circuit 300 changes from transition state 5 to transition state 6 by opening switches 308 and 310, which disconnects capacitor bank 330 from the remainder of circuit 300. This is shown in FIG. 7H. During this state, current continues to be supplied to $V_{OUT}$ by current source 303 and capacitor bank 335. The current flow path from current source 303 to $V_{OUT}$ is maintained, which keeps the output current constant. During this period, the internals of capacitor bank 330, should be changed from its discharge configuration to its charge configuration. Next, circuit 300 changes back to phase 1, and the cycle described above is repeated.

As mentioned above, current source 305 is used to replenish the charge on the capacitor banks 330 and 335. Accordingly, it is desirable to choose its value such that it is at least large enough to replace the charge lost during the rest of the cycle (during the capacitor's designated recharge period). The calculation of lost charge may account for changes in the type of charge/discharge connection and charge and discharge time and rate. This may be accomplished using the formulas and methodologies described above in connection with circuit 100.

Furthermore, current source 305 preferably includes a voltage clamp circuit to maintain its voltage drop above a certain minimum level when sourcing current from $V_{IN}$. Accordingly, during transition states 1-6, when one terminal of current source 305 is disconnected from the capacitors, it will naturally stop at the highest level permitted by the voltage clamp, which shunts its current to $V_{OUT}$. This is done to maintain the current from $V_{IN}$ and to $V_{OUT}$ constant. Thus, the current supplied to $V_{OUT}$ is equal to the sum of the currents provided by source 305 and 303. In certain specific implementations, current source 305 will have some minimum voltage across it below which its current is no longer constant, and it is desirable that the clamp voltage is chosen to be larger than this minimum value.

The voltage clamp also allows the selection of the current source 305 to be greater than the minimum value described above without impairing the operation of circuit 300. This allows for some variation in its operating parameters (and accordingly for component values which vary somewhat during circuit fabrication). During phase 1 and/or 2, if the value of current source 305 is larger than that required, its voltage will reach the clamp threshold and stop charging the capacitor banks before the end of the phase (i.e., more quickly than is required), but without affecting the current drawn from $V_{IN}$ or delivered to $V_{OUT}$.

Moreover, although it is desirable to choose the clamp voltage to be somewhat larger than the minimum required in order to a have constant output current from current source 305, in some embodiments it may be further desirable to have this value be as close to this minimum as possible, because the clamp voltage reduces the maximum amount of charge which can be stored on the capacitors, and thus the maximum attainable output voltage. However, when current source 305 is clamped, its current is wasted power, because it is used to keep the terminal currents constant, and not to charge or discharge a capacitor. In view of this condition, it may be desirable in certain embodiments to make the current level of source 305 as close to the minimum as possible (without going under), and minimize the amount of time that circuit 300 spends in transition states 1-6 (which will reduce the minimum current value), subject to the constraint that at some point faster switching may, due to other effects, cause substantial supply spikes by itself.

In some embodiments, circuit 300 may be further improved by replacing the switches directly connected to source 303 (switches 308 and 316) with switched current-passing elements which do not force capacitor banks 330 and 335 to have equal voltage during transition states 2 and 5. This allows the capacitor bank which is beginning to discharge (e.g., 330 in transition state 2) to retain more of its charge and maintain a higher voltage in its discharge phase (e.g., phase 2 for bank 330). This may be accomplished by appropriate modification of the control signal for an active switch or by using suitable biasing techniques (e.g., to maintain a MOSFET in its saturation region instead of its triode region, etc.).

Figure 8:
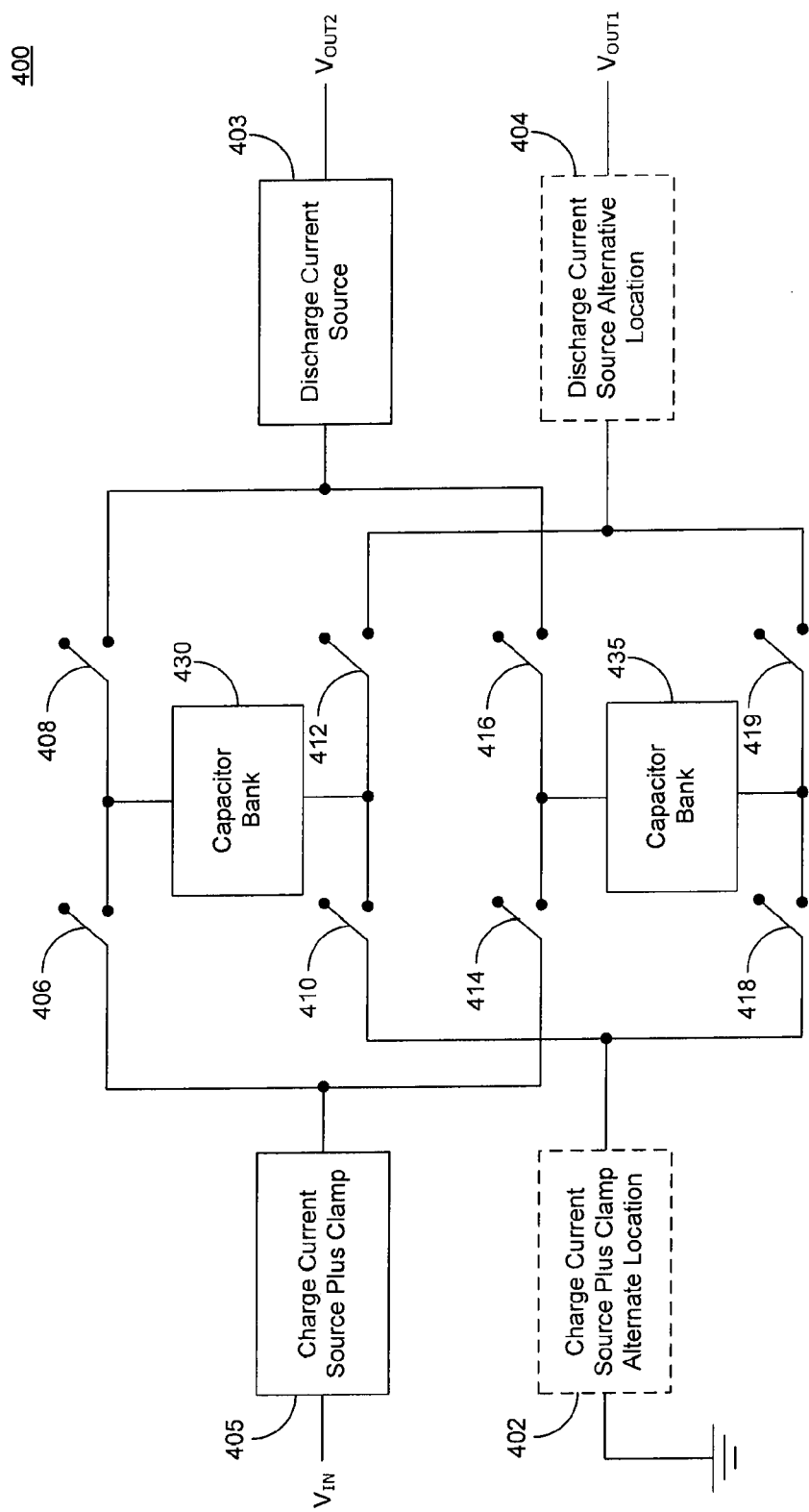
FIG. 8 is a generalized block diagram of one embodiment of a charge pump circuit suitable for providing an isolated output voltage in accordance with the principles of the present invention.

A general block diagram of another embodiment of a charge pump circuit constructed in accordance with the principles of present invention is shown in FIG. 8. This configuration is suitable for providing a an electrically isolated output voltage, which when coupled with regulation circuitry, provides a regulated voltage which electrically isolates $V_{IN}$ from $V_{OUT}$ (i.e., an isolated topology). As shown, circuit 400 may generally include current sources 403 and 405, switches 406-419, and capacitor banks 430 and 435. In some embodiments, circuit 400 may be configured to include alternate current sources 402 and 404 rather than sources 403 and 405 (as indicated by the dotted lines).

Generally speaking, either current sources 403 and 405 are used, or sources 402 and 404, but not both (i.e., only two are used). Embodiments using current sources 402 and 403 may be used if desired, as well as embodiments using current sources 404 and 405. The selection of current source 402 or 405 may be made independent of the selection of current sources 403 or 404 and vice versa. Embodiments using current sources 403 and 405 are described below for simplicity. It will be understood, however, that embodiments using the other current sources mentioned above may be used if desired using the principles described herein.

In operation, charge pump circuit 400 may draw a substantially constant input current at $V_{IN}$ and provide a substantially constant differential output current between $V_{OUT1}$ and $V_{OUT2}$. Current spikes at the switching intervals are reduced or substantially eliminated. One way this may be accomplished is by controlling switches 406-419 such that current source 403 has a substantially uninterrupted current flow path through capacitor banks 430 or 435 from $V_{OUT1}$ to $V_{OUT2}$. Circuit 400 may operate in two (or more) phases such that capacitor bank 430 charges while capacitor bank 435 discharges and vice versa. With the configuration shown in FIG. 8, current source 403 is responsible for discharging capacitor banks 430 and 435, whereas current source 405 is responsible for charging capacitor banks 430 and 435 (described in more detail below in connection with FIG. 9).

Switches 406-419 shown in FIG. 8 may be physically implemented in numerous ways. For example, switches 406-419 may be implemented as any suitable type of armature or semiconductor based switch. Moreover, in some embodiments, current sources 403 and 405 may be controlled or programmable current sources rather than fixed current sources. For example, circuit 400 may contain sensing circuitry (not shown) which adjusts the current level based on certain external conditions such as the input voltage or current provided at $V_{IN}$ or the current or voltage level present (or required) at $V_{OUT}$. Circuit 400 may further interface with or include circuitry for establishing the current level of current sources 403 and 405 such as external digital control signals, or include programmable memory circuits for that may be programmed to establish current level (not shown).

Additionally, current source 405 preferably includes voltage clamp circuitry to prevent its voltage drop from falling below a desirable level by shunting current to ground (or to $V_{IN}$ in embodiments using alternate source 402). During the transition between operating phases, current source 405 experiences periods during which it is not connected to capacitor banks 430 or 435, and the clamp circuitry provides a current flow path for the source during that time, which maintains the input current substantially constant. During these transition states, current is delivered from current source 405 to ground through the voltage clamp.

In embodiments where the clamp circuitry is included in current source 405, the input current of the circuit is maintained through the transition period at a level substantially the same as it is in other phases. This ensures that the total input current is maintained substantially constant throughout the operation of the charge pump, because the current flow path from $V_{IN}$ continuously passes through current source 405. It will be understood, however, that in alternate embodiments, any other suitable circuitry may be used to maintain the input current substantially constant, if desired.

Capacitor banks 430 and 435 may be configured as capacitor bank 150 as described above (shown in FIG. 2). Whether isolated charge pump circuit 400 provides a boost or step down function may depend on the configuration of the capacitors in banks 430 and 435 (e.g., parallel-to-series for boost, series-to-parallel for buck, etc.). In some embodiments capacitor banks 430 and 435 may each include only one capacitor. It will be understood, however, that any suitable capacitor configuration may be used if desired.

Referring now back to FIG. 8, circuit 400 may used to provide an isolated differential output voltage between $V_{OUT1}$ and $V_{OUT2}$ having a substantially constant output current with current spikes at the switching intervals minimized or substantially eliminated. As mentioned above, circuit 400 generally operates in two phases, referred to herein as phase 1 and phase 2. During phase 1, current is provided to the differential output of circuit 400 by the discharge of capacitor bank 435 caused by current source 403. Concurrently, capacitor bank 430 is coupled to ground and current source 405 causing it to be charged by current drawn from $V_{IN}$ by source 405. Accordingly, during phase 1, capacitor bank 430 is placed in its charging configuration, whereas capacitor bank 435 is in its discharge configuration.

Next, after several transition phases, circuit 400 reaches phase 2 during which capacitor bank 430 is coupled to the differential output of circuit 400 by current source 403, which causes it to discharge. Concurrently, capacitor bank 435 is coupled to ground and current source 405, which causes it to be charged by current drawn from $V_{IN}$ by source 405. During phase 2, capacitor bank 435 is placed in its charging configuration, whereas capacitor bank 430 is in its discharge configuration. This cycle is repeated, and circuit 400 produces an isolated output voltage with substantially constant input and output current.

The current produced by current source 403 should be selected (or controlled) to be substantially constant and match the desired (or required) output current of circuit 400. This allows circuit 400 to provide a substantially constant output current through capacitor banks 430 and 435. Source 405, however, need only be large enough to replace the charge lost on capacitor banks 430 and 435 during the rest of the switching cycle. Nevertheless, source 405 should also be configured such that it is substantially constant to maintain the input current drawn at $V_{IN}$ substantially constant.

Turning now to FIGS. 9A-9H, a more detailed depiction of circuit 400 and its various phases of operation and transition states is shown. Initially, assume circuit 400 begins in phase 1 of operation (which may occur after a brief initialization phase, during which a minimum amount of charge is imparted to capacitor banks 430 and 435 (e.g., by connecting capacitor banks 430 and 435 to current source 405)).

Figure 9A:
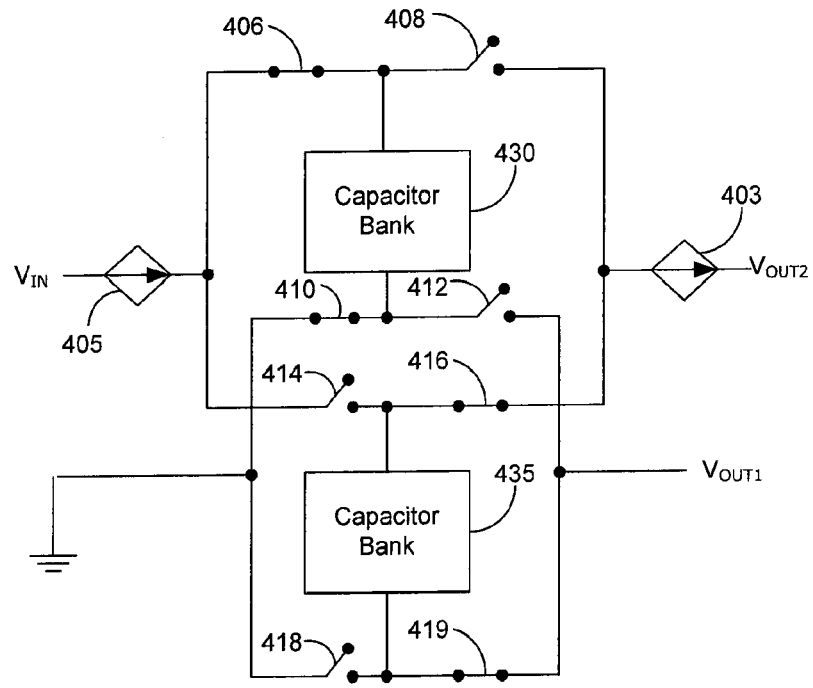
FIGS. 9A-9H are block diagrams illustrating the various states of operation of the charge pump circuit of FIG. 8.

At this point, switches 406, 410, 416 and 419 are closed, with the remainder of the switches open. This is shown in FIG. 9A. Using this configuration, current flows from capacitor bank 435 and switch 416 to source 403 and then to $V_{OUT2}$. A differential reference is provided by the connection of the bottom terminal of capacitor bank 435 to $V_{OUT1}$. Current also flows from $V_{IN}$ to current source 405, which charges capacitor bank 430. As mentioned above, the value of current source 403 is selected to substantially match the desired output current. As a result, the output current at $V_{OUT}$ matches this current value. During phase 1, capacitor bank 430 is in its charge configuration, and capacitor bank 435 is in its discharge configuration.

Figure 9B:
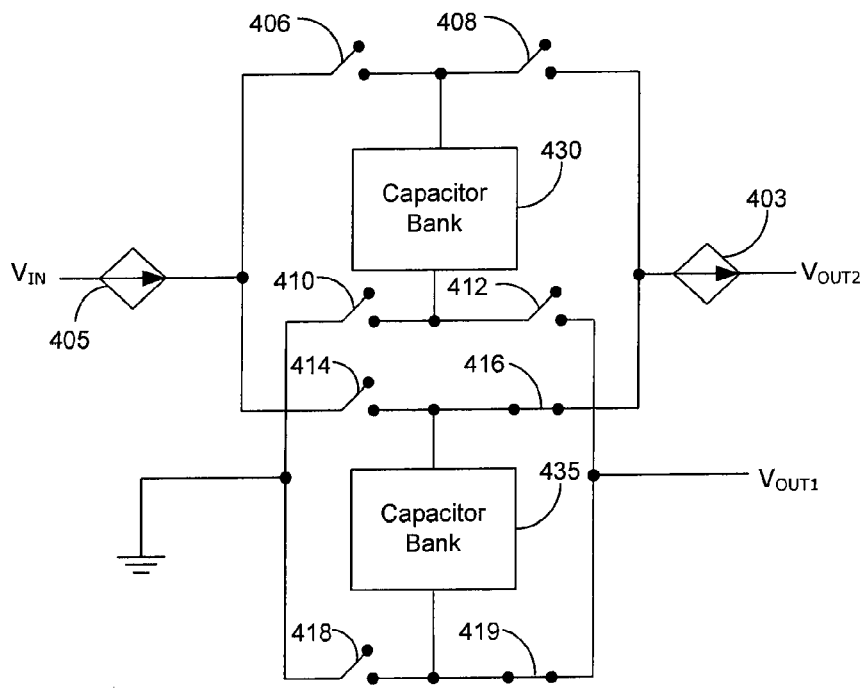
Figure 9C:
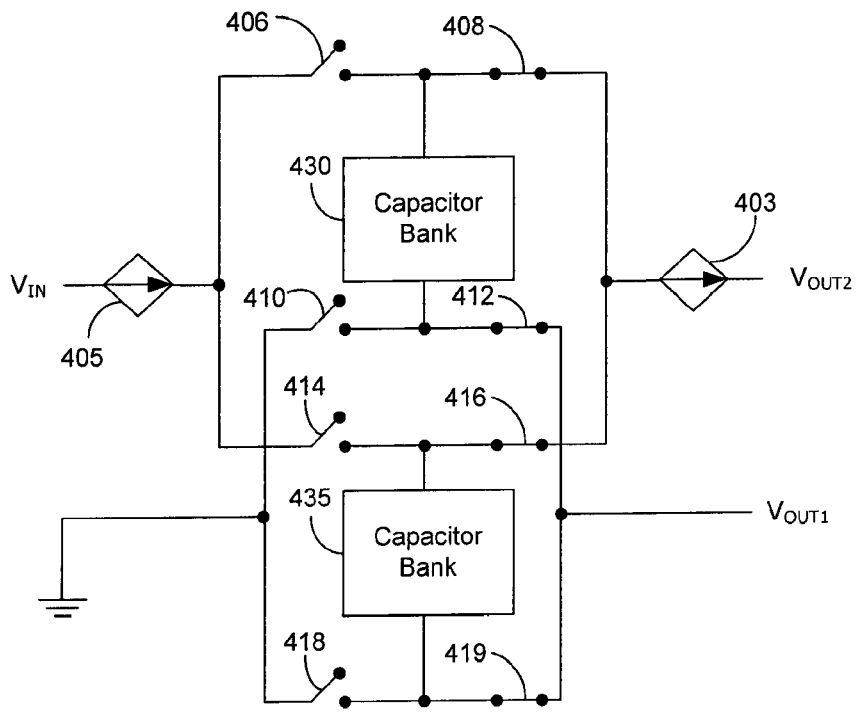
Figure 9D:
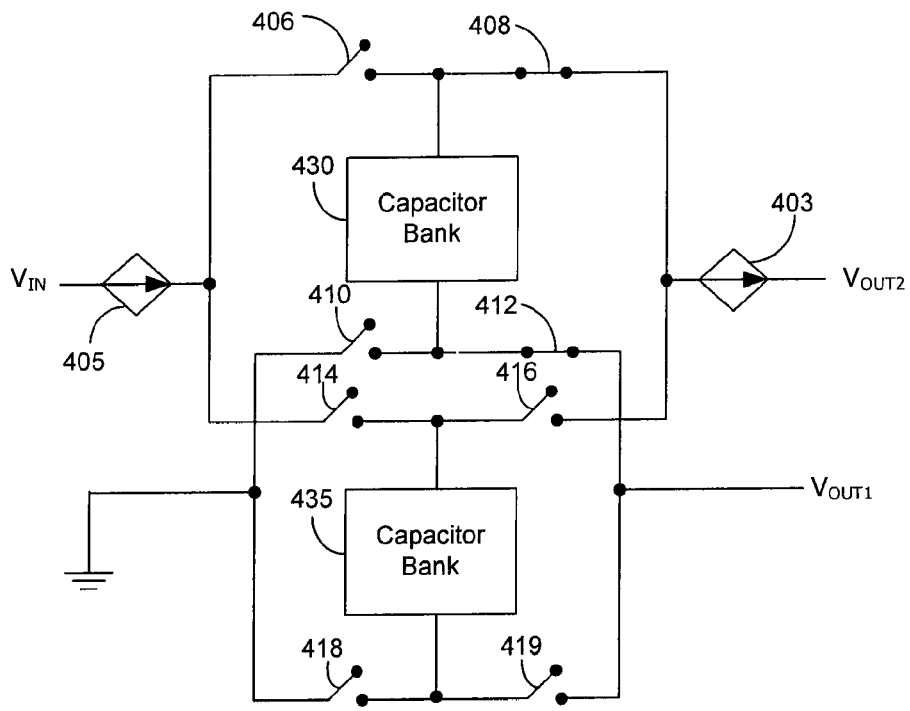

Next, after an appropriate time has passed, which may be based on the discharge rate of capacitor bank 435, circuit 400 begins its transition to phase 2 by way of transition states 1-3, which are depicted in FIGS. 9B-9D. For example, circuit 400 may transition from phase 1, to transition state 1, to avoid discharging capacitor bank 435 beyond a predetermined point.

Circuit 400 changes from phase 1 to transition state 1 by opening switches 406 and 410, which disconnects capacitor bank 430 from the remainder of circuit 400. This is shown in FIG. 9B. During this state, current continues to be supplied to $V_{OUT}$ by current source 403 and capacitor bank 435, maintaining the output current substantially constant. Moreover, because capacitor terminals in capacitor bank 430 are preferably not connected to more than one voltage at the same time, it is desirable to have a period during which a given terminal is not connected to either voltage. For capacitor bank 430, this occurs during transition states 1 and 6. During transition state 1, capacitor bank 430 may be internally reconfigured from its charge to its discharge configuration.

Next, circuit 400 changes from transition state 1 to transition state 2 by closing switches 408 and 412, which reconnects capacitor bank 430 to circuit 400 and specifically to $V_{OUT}$. This is shown in FIG. 9C. During this state, current continues to be supplied to $V_{OUT}$ by current source 403, although now it is being supplied through both capacitor banks 430 and 435. More specifically, for the differential output shown, the top plates of capacitor banks 430 and 435 are coupled to $V_{OUT2}$ through current source 403 and the bottom plates of capacitor banks 430 and 435 are coupled to $V_{OUT1}$.

Because the output current is being controlled by a single current source (403) it is possible to connect both capacitor banks without changing the terminal currents (both input and output). This is an important transition state which provides a smooth handover, allowing capacitor bank 435 to be disconnected from circuit 400 (for subsequent charging) while maintaining the current flow path through capacitor bank 430 from current source 403. The allows circuit 400 to reduce and/or avoid altogether current (or voltage) spikes that might otherwise occur when capacitor bank 430 is reconnected $V_{OUT}$.

Circuit 400 changes from transition state 2 to transition state 3 by opening switches 416 and 419, which disconnects capacitor bank 435 from the remainder of circuit 400. This is shown in FIG. 9D. During this state, current continues to be supplied to $V_{OUT}$ by current source 403 and capacitor bank 430. This maintains the current flow path from current source 403 to $V_{OUT}$, which keeps the differential output current constant. Moreover, because capacitor terminals in capacitor bank 435 are preferably not connected to more than one voltage at the same time, it is desirable to have a period during which a given terminal is not connected to either voltage. For capacitor bank 435, this period occurs during transition states 3 and 4. During this period, the internals of capacitor bank 435 are changed from its discharge configuration to its charge configuration.

Figure 9E:
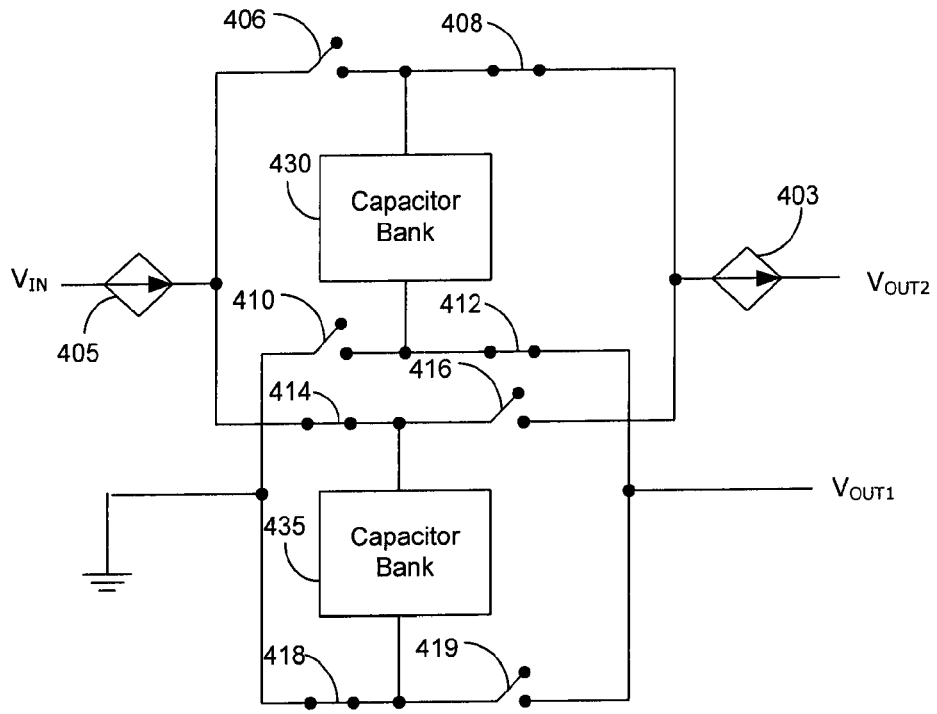

Circuit 400 changes from transition state 3 to phase 2 by closing switches 414 and 418, which connects capacitor bank 435 to ground and current source 405. This is shown in FIG. 9E. With this configuration, current flows from $V_{IN}$ through current source 405 and switch 414 to capacitor bank 435, charging it. In addition, current flows from capacitor bank 430 to $V_{OUT}$. During phase 2, capacitor bank 435 is in its charging configuration, whereas capacitor bank 430 is in its discharge configuration.

Figure 9F:
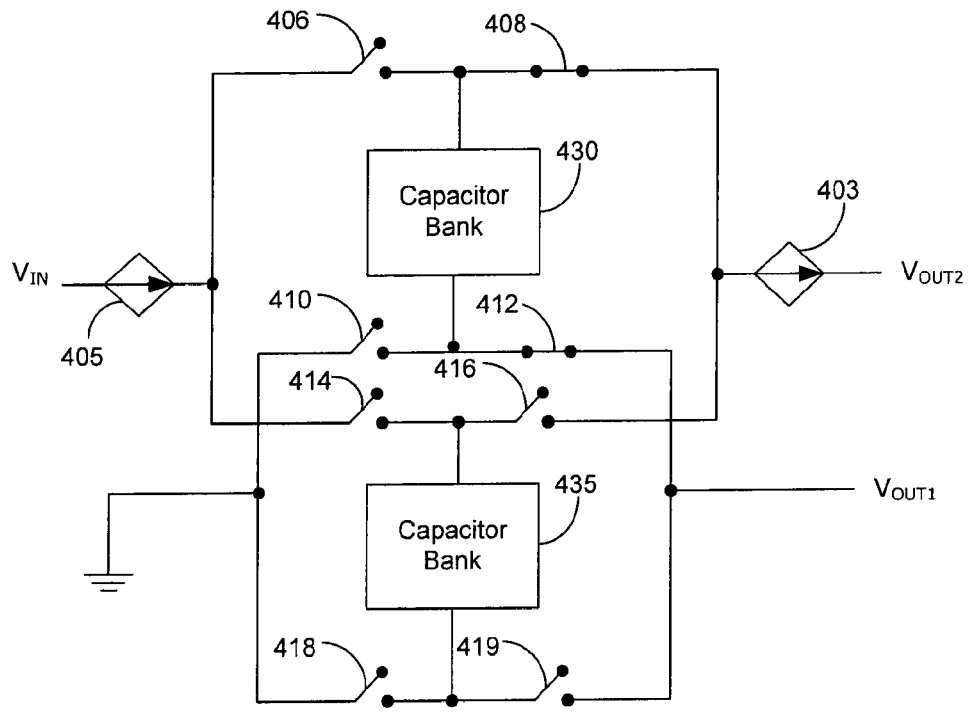
Figure 9G:
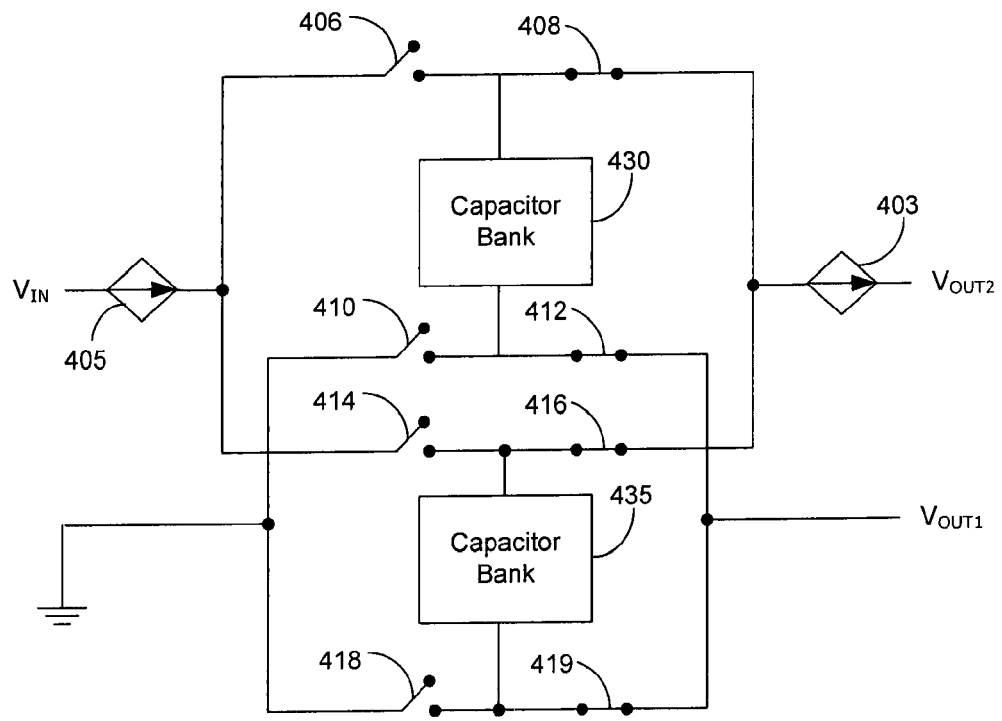
Figure 9H:
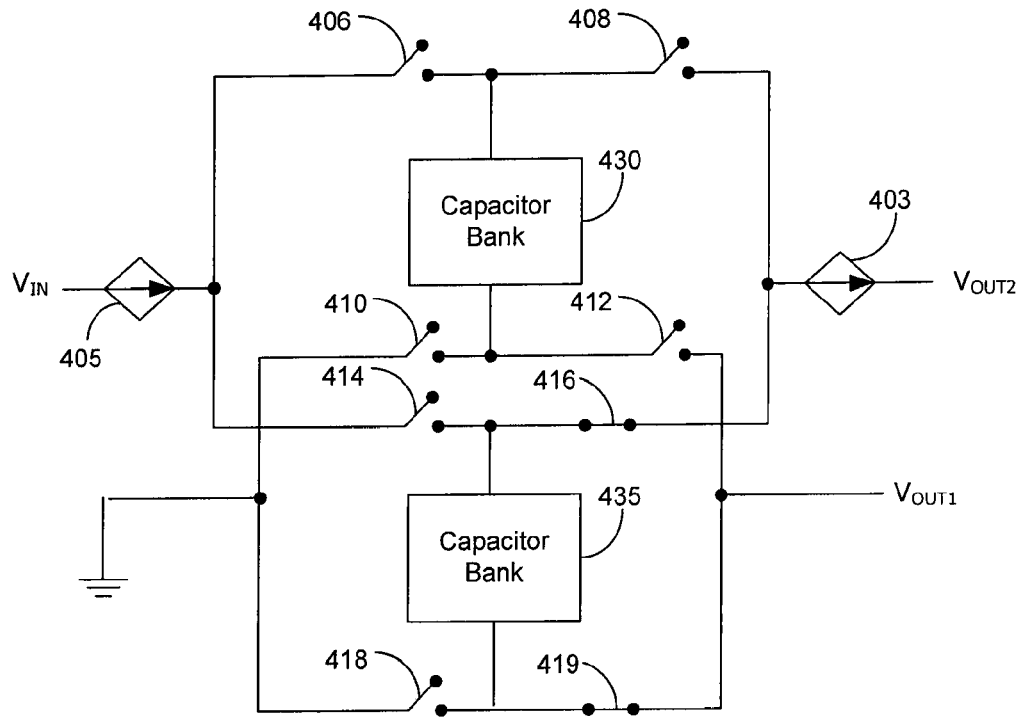

At this point, after an appropriate time has passed, which may be based on the discharge rate of capacitor bank 430, circuit 400 transitions back to phase 1 by way of transition states 4-6, which are depicted in FIGS. 9F-9H. For example, circuit 400 may transition from phase 2 to transition state 4 to avoid discharging capacitor bank 430 beyond a predetermined point.

Circuit 400 changes from phase 2 to transition state 4 by opening switches 414 and 418, which disconnects capacitor bank 435 from the remainder of circuit 400. This is shown in FIG. 9F. During this state, current continues to be supplied to $V_{OUT}$ by current source 403 and capacitor bank 430. This maintains the current flow path from current source 403 to $V_{OUT}$, which keeps the output current constant. During this period, the internals of capacitor bank 435 should be changed from its charge configuration to its discharge configuration.

Next, circuit 400 changes from transition state 4 to transition state 5 by closing switches 416 and 419, which reconnects capacitor bank 435 to circuit 400 and to $V_{OUT}$. This is shown in FIG. 9G. More specifically, during this state, current continues to be supplied to $V_{OUT}$ by capacitor banks 430 and 435 through current source 403, with the differential reference provided by the bottom plates of the capacitor banks. Because the output current is being controlled by a single current source (403) it is possible to connect both capacitor banks without changing the terminal currents (both input and output). This is an important transition which provides a smooth handover, allowing capacitor bank 430 to be disconnected from circuit 400 (for subsequent charging) while maintaining the current flow path through capacitor bank 435 from current source 403. The allows circuit 400 to reduce and/or avoid altogether current (or voltage) spikes that might otherwise occur when capacitor bank 435 is reconnected $V_{OUT}$.

At this point, circuit 400 changes from transition state 5 to transition state 6 by opening switches 408 and 412, which disconnects capacitor bank 430 from the remainder of circuit 400 (shown in FIG. 9H). During this state, current continues to be supplied to $V_{OUT}$ by current source 403 and capacitor bank 435. This maintains the current flow path from current source 403 to $V_{OUT}$, which keeps the output current constant. During this period, the internals of capacitor bank 430, should be changed from its discharge configuration to its charge configuration. Next, circuit 400 changes back to phase 1, and the cycle described above is repeated.

As mentioned above, current source 405 is used to replenish the charge on the capacitor banks 430 and 435. Accordingly, it is desirable to choose its value such that it is at least large enough to replace the charge lost during the rest of the cycle (during the capacitor's designated recharge period). The calculation of lost charge may account for changes in the type of charge/discharge connection and charge and discharge time and rate. This may be accomplished using the formulas and methodologies described above in connection with circuit 100.

Furthermore, as mentioned above, current source 405 preferably includes a voltage clamp circuit to maintain its voltage drop above a certain minimum level when sourcing current from $V_{IN}$. Accordingly, during transition states 1-6, when one terminal of current source 405 is disconnected from the capacitors, it will naturally stop at the highest level permitted by the voltage clamp, which shunts its current to ground. This is done to maintain the current from $V_{IN}$ constant (which is being drawn from $V_{IN}$ during phases 1 and 2). In certain specific implementations, current source 405 will have some minimum voltage across it below which its current is no longer constant, and it is desirable that the clamp voltage is chosen to be larger than this minimum value.

The voltage clamp also allows the selection of the current source 405 to be greater than the minimum value described above without impairing the operation of circuit 400. This allows for some variation in its operating parameters (and accordingly for component values which vary somewhat during circuit fabrication). During phase 1 and/or 2, if the value of current source 405 is larger than that required, its voltage will reach the clamp threshold and stop charging the capacitor banks before the end of the phase (i.e., more quickly than is required), but without affecting the current draw from $V_{IN}$.

Moreover, although it is desirable to choose the clamp voltage to be somewhat larger than the minimum required in order to a have constant output current from current source 405, in some embodiments it may be further desirable to have this value be as close to this minimum as possible, because the clamp voltage reduces the maximum amount of charge which can be stored on the capacitors, and thus the maximum attainable output voltage.

However, when current source 405 is clamped, its current is wasted power, because it is used to keep the input current constant, and not to charge or discharge a capacitor. In view of this condition, it may be desirable in certain embodiments to make the current level of source 405 as close to the minimum as possible (without going under), and minimize the amount of time that circuit 400 spends in transition states 1-6 (which will reduce the minimum current value), subject to the constraint that at some point faster switching may, due to other effects, cause substantial supply spikes by itself.

In some embodiments, circuit 400 may be further improved by replacing the switches directly connected to source 403 (switches 408 and 416) with switched current-passing elements that do not force capacitor banks 430 and 435 to have equal voltage across them during transition states 2 and 5. This allows the capacitor bank which is beginning to discharge (e.g., 430 in transition state 2) to retain more of its charge and maintain a higher voltage in its discharge phase (e.g., phase 2 for bank 430). This may be accomplished by appropriate modification of the control signal for an active switch or by using suitable biasing techniques (e.g., to maintain a MOSFET in its saturation region instead of its triode region, etc.).

Although the circuits described above use two capacitor banks to accomplish the function of substantially constant input and/or output currents, it will be appreciated that similar techniques may be applied to the construction of charge pump circuits having three or more capacitor banks to achieve the benefits described herein.

Figure 10:
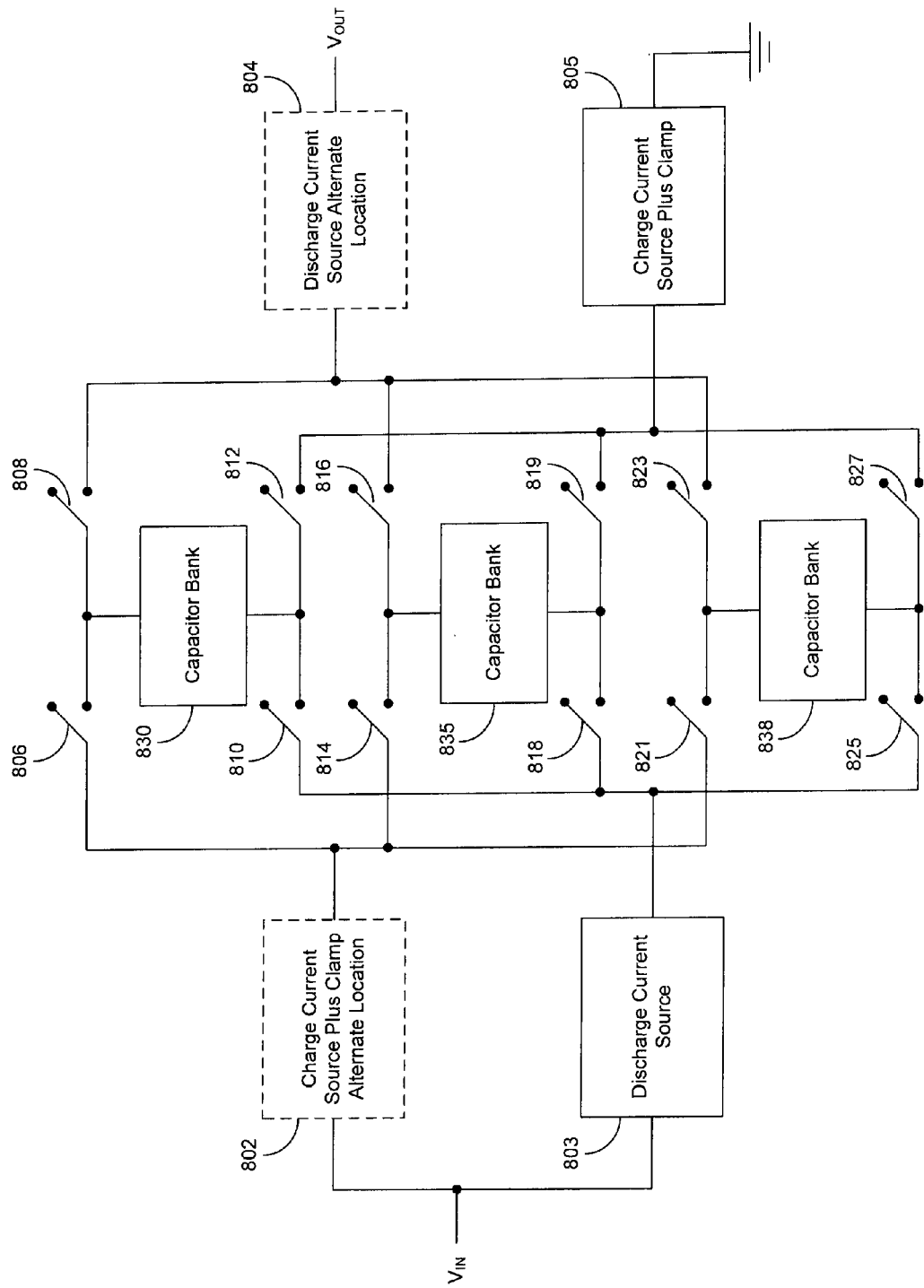
FIG. 10 is a generalized block diagram of one embodiment of a charge pump circuit using three capacitor banks suitable for providing a boosted output voltage in accordance with the principles of the present invention

An example of such an implementation is shown in FIG. 10, which is a three-capacitor-bank embodiment of the circuit illustrated in FIG. 1 (i.e., produces a boosted output voltage). The function of the specific circuit in FIG. 10 is described below for illustrative purposes only, and it will be understood that similar techniques may be used to construct a three-capacitor-bank version of other topologies (e.g., such as circuit 300 or 400) and that such techniques may be readily extended to implementations with four or more capacitor banks (not shown). Additionally, the description below assumes for simplicity that current sources 803 and 805 have been selected. Alternate implementations may use current sources 802 instead of 803 and/or 804 instead of 805.

In general, circuit 800 operates in six basic phases plus associated transition states (not shown). In the first phase, capacitor bank 830 is charging from the input through source 805 while capacitor banks 835 and 838 are discharging to provide current to the output in parallel through source 803. Capacitor bank 835 may then be disconnected from the output and connected to the input in phase 2 to charge in parallel with capacitor bank 830, while capacitor bank 838 continues to supply current to the output.

Capacitor bank 830 is then disconnected from the input and connected to the output for phase 3, where it supplies current in parallel with capacitor bank 838, while capacitor bank 835 continues to charge from the input. Capacitor bank 838 is then disconnected from the output and connected to the input for phase 4, in which capacitor banks 835 and 838 charge in parallel from the input while 830 supplies current to the output. Capacitor bank 835 is then disconnected from the input and connected to the output for phase 5, in which capacitor bank 838 charges from the input while capacitor banks 830 and 835 in parallel supply current to the output. Capacitor bank 830 is then disconnected to the output and connected to the input for phase 6, in which capacitor banks 830 and 838 charge in parallel from the input while capacitor bank 835 delivers current to the output. Finally, capacitor bank 838 disconnects from the input and connects to the output, returning to phase 1 and starting the cycle over again.

In the sequence above, each transition between phases preferably involves switching only one capacitor bank, while one capacitor bank remains connected to the input and one remains connected to the output. This ensures that there is a constant current flow path for current source 803 and for current source 805, which in turn ensures substantially constant input and output current, even without a voltage clamp in source 805 (however, this clamp, or other similar circuitry, may still be desirable for other reasons).

In circuit 100 illustrated in FIG. 1, the clamping of the input voltage during the transition states represents wasted power. Accordingly, one benefit of circuit 800, which does not require such a clamp, includes improved power efficiency. Furthermore, because this operation of circuit 800 includes a capacitor bank charging from the input and discharging to the output at substantially all times, small residual disturbance effects related to the variation of capacitance on the terminals are reduced for some implementations (e.g., as compared to circuit 100).

Finally, embodiments of circuit 800 may switch fewer (and smaller) switches during each transition. Because switching generally disturbs the system slightly, this smaller, higher frequency disturbance pattern may be more attractive in some application environments than the disturbance pattern of circuit 100.

As explained above, the charge pump circuits described above are constructed to provide a substantially constant output current with an optionally constant input current. In certain instances, however, it may be desirable to use this constant output current to generate a substantially constant output voltage. In general, this may be accomplished by coupling voltage regulation circuitry to the output of the various charge pump circuits described above, creating a voltage regulator circuit.

For example, the charge pump circuit of FIG. 1 may be combined with voltage regulation circuitry to create a boost voltage converter. Similarly, the charge pump circuit of FIG. 6 may be combined with voltage regulation circuitry to create a buck voltage converter, and the isolated charge pump circuit shown in FIG. 8 may be used to created a isolated voltage converter.

Figure 11:
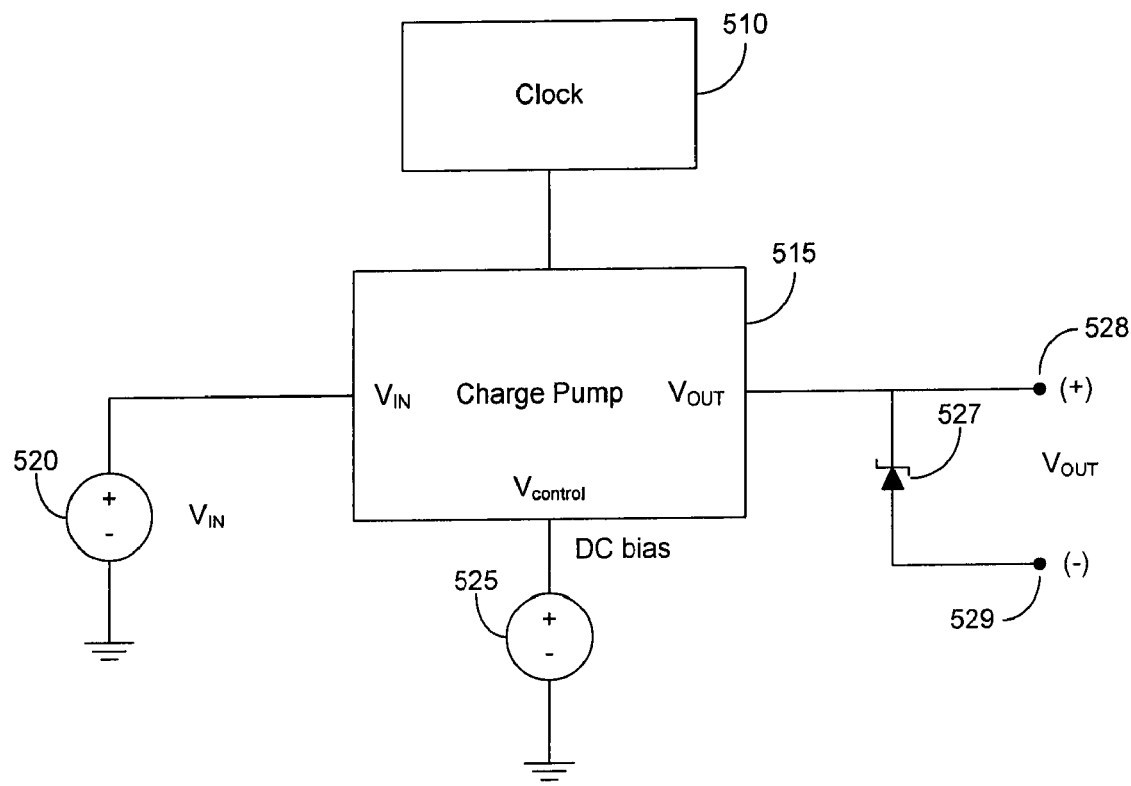
FIGS. 11-13 are schematic diagrams of voltage regulation circuitry that may be used in conjunction with the charge pump circuitry shown in FIGS. 1, 6, 8, and 10.

A simple voltage converter circuit using the charge pump circuits of the present invention is shown in FIG. 11. As shown, charge pump circuit 515, (which may be any of the charge pump circuits described herein) may be coupled to a shunt regulator circuit such as zener diode 527 to produce a substantially constant output voltage. In operation, $V_{IN}$ may be applied to charge pump circuit 515, with clock signals (such as those shown in FIG. 5) provided by clock generation circuit 510 and control voltage provided by voltage source 525. With this configuration, charge pump 515 produces a substantially constant output current, and so zener diode 527 produces a substantially constant output voltage across output terminals 528 and 529. In certain embodiments, other clamping devices, and more sophisticated shunt regulators, may be used if desired. Such shunt-based topologies, however, typically suffer from poor efficiency during light load conditions and have relatively high output impedances at low frequency.

Another approach to provide voltage regulation involves treating the entire charge pump circuit as a controlled current source affected by the error between the output voltage and a reference voltage (i.e., a transconductance amplifier). Because there is substantially no delay in the input-to-output transfer for the charge pump circuit, methods of compensating a transconductance loop (e.g. a capacitor on the charge pump output, as a simple example) may be used as a way to regulate output voltage.

For example, in the boost and isolated topologies shown in FIGS. 1 and 8, respectively, only source 103 (FIG. 1) or source 403 (FIG. 8) need to be controlled to accomplish this function. However, as pointed out above, sources 105 (FIG. 1) and 405 (FIG. 8) should be large enough to ensure that charge is replenished during the recharge cycle. Therefore, sources 105 and 405 may be chosen as a constant current sources based on the maximum value sources 103 or 403 are assigned, which again represents an inefficiency at light load (though less so than with a shunt-based regulator).

Alternatively, sources 105 and 405 may also be controlled to track sources 103 and 403 at a constant ratio, or ratio-plus-offset, which will give near-optimum efficiency at all operating currents.

For the output-voltage-reducing topology (e.g. circuit 300), if the value of source 305 is fixed, it imposes a minimum on the possible output current (in addition to the maximum for the other topologies), so controlling both the charging and discharging current sources is beneficial. Although in the other topologies, the charging current source is not directly part of the transconductance loop (which may simplify its design and control), in the voltage-reducing converter, the charging and discharging current sources may contribute directly to output current, and charging current source must be controlled accordingly.

Figure 12:
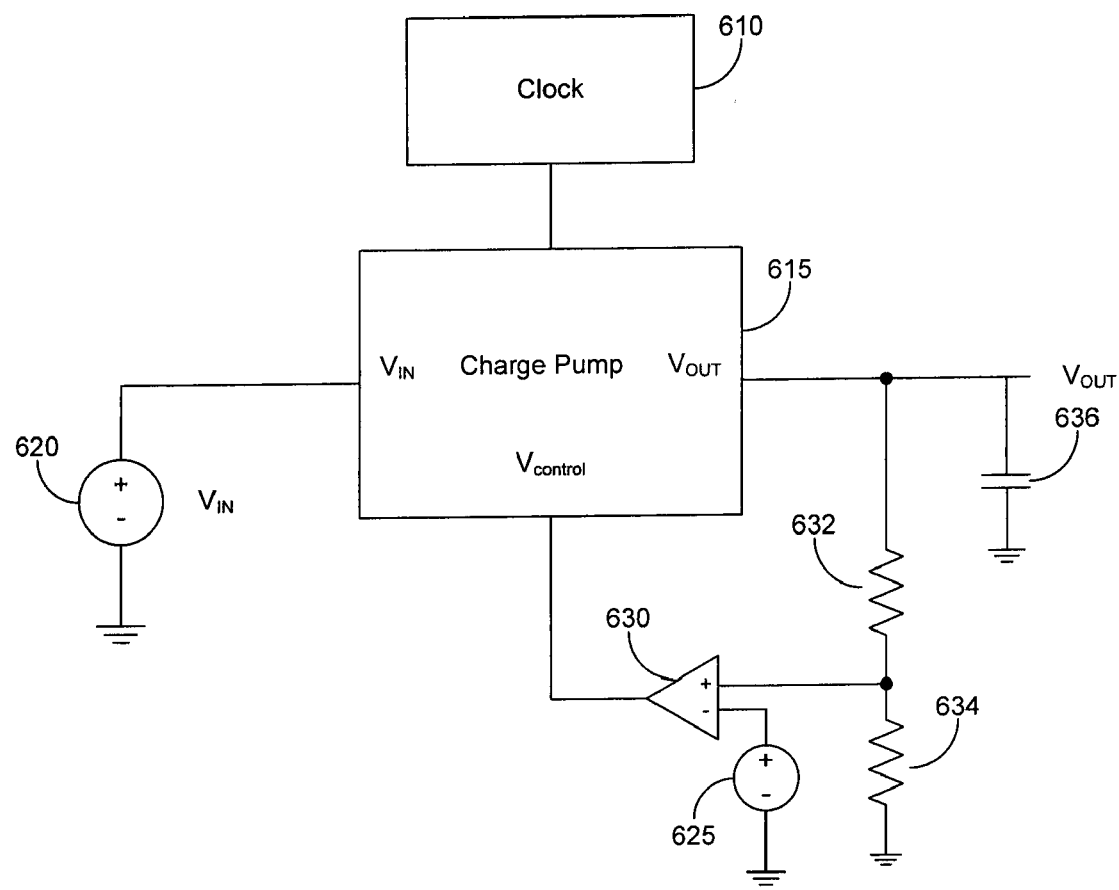

An example of a regulator based on transconductance compensation techniques is shown as circuit 600 in FIG. 12. As illustrated, circuit 600 includes charge pump circuit 615, which may be any of the charge pump circuits described herein, input voltage 620, clock generation circuit 610, reference voltage 625, error amplifier 630, a voltage divider network formed by resistors 632 and 634 and output capacitor 636.

In operation, $V_{IN}$ may be applied to charge pump circuit 615, with clock signals (such as those shown in FIG. 5) provided by clock generation circuit 610. The feedback loop created by error amplifier 630 compares the output voltage to that generated by voltage reference 625 and produces an error signal that maintains $V_{OUT}$ substantially equal to the value given by equation 8 below.

For the feedback polarity shown, the $V_{control}$ terminal of the circuit 615 is assumed to have an inverting characteristic to the output current. The loop will then regulate the output voltage according to equation 8 below:

$$V_{OUT} = V_{REF}\left(1 + \frac{R_{632}}{R_{634}}\right). \quad (8)$$

The total effective transconductance to the output is the voltage gain of error amplifier 630 multiplied by the transconductance of circuit 615 times the resistor attenuation ratio R1/(R1+R2). The loop formed by the output of charge pump 615 and error amplifier 630 will then be stably compensated as long as error amplifier and the resistive divider have no poles before the frequency at which the susceptance of the capacitor substantially equals the transconductance.

A third type regulation circuit may be created which combines some of the advantages of the two schemes described in FIGS. 11 and 12 above. For example, a shunt regulator may placed on the charge pump output which allows the shunt current to be sensed. The difference between the sensed current and a reference current may used to control the current sources in the charge pump (e.g., discharge current sources as described above), forcing the shunt current to be a fixed value. This improves the loaded low-frequency accuracy of the shunt-regulation approach, because the shunt device operates at constant current.

Additionally, the shunt current can be selected to be substantially less than the maximum load current, since load current is not subtracted from the shunt current, which dramatically improves efficiency.

Figure 13:
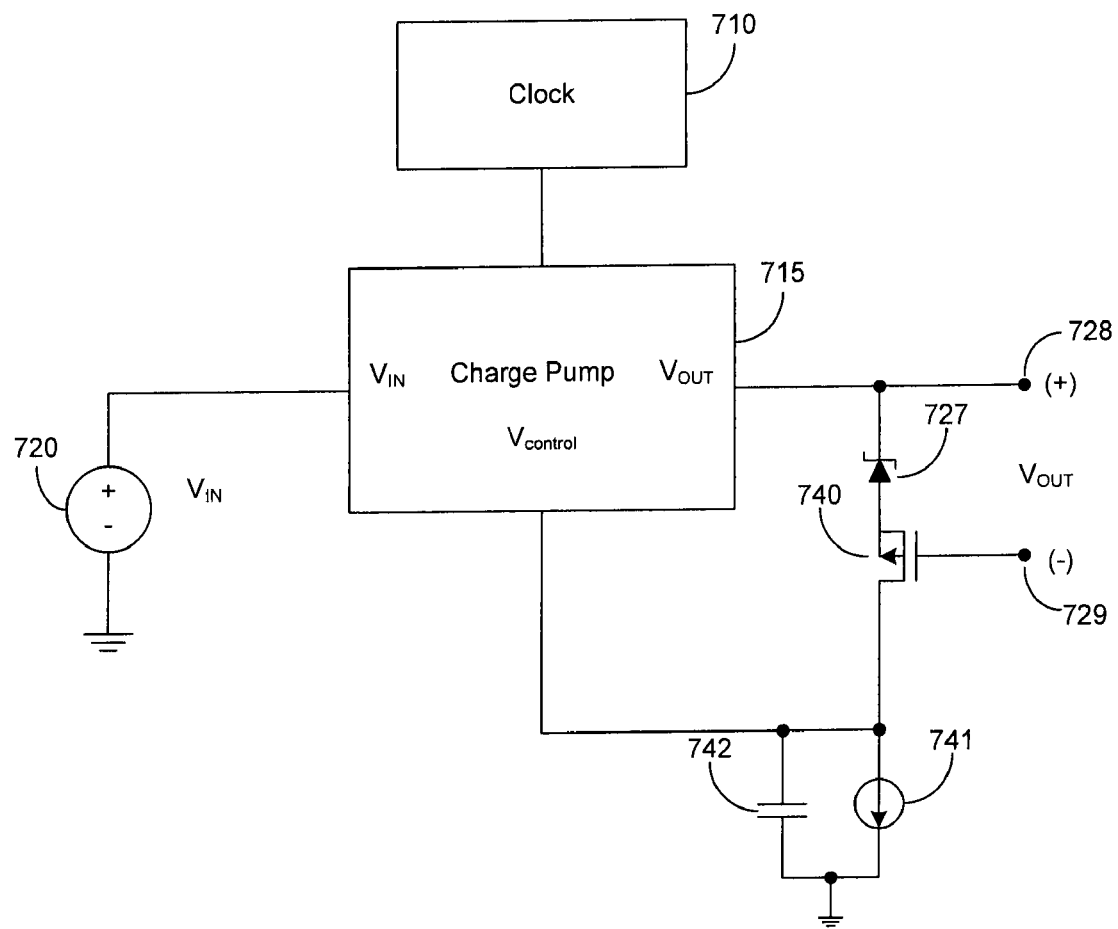

An example of a voltage regulator based on this hybrid regulation scheme is shown as circuit 700 in FIG. 13. As illustrated, circuit 700 includes charge pump circuit 715, which may be any of the charge pump circuits described herein, input voltage source 720, clock generation circuit 710, zener diode 727, PMOS transistor 740, reference current 741 and compensation capacitor 742.

In operation, $V_{IN}$ may be applied to charge pump circuit 715, with clock signals (such as those shown in FIG. 5) provided by clock generation circuit 710. Zener diode 727 and PMOS 740 generate a constant voltage at output terminal 728 at a fixed level above terminal 729. this voltage is determined by the sum of the voltage generated by zener diode 727 ($V_{zener}$) and the gate to source voltage drop of PMOS 740 ($V_{GS}$) at a the current of reference current 741 ($I_{REF}$). Compensation of this loop varies depending on nature of the output loading. A value for capacitor 742 can be selected to provide the appropriate compensation assuming there is no substantial capacitive load on the output. Additional compensation components (or schemes) may be required for more general or varying loads.

Although preferred embodiments of the present invention have been disclosed with various circuits connected to other circuits, persons skilled in the art will appreciate that it may not be necessary for such connections to be direct and additional circuits may be interconnected between the shown connected circuits without departing from the spirit of the invention as shown. Persons skilled in the art also will appreciate that the present invention can be practiced by other than the specifically described embodiments. The described embodiments are presented for purposes of illustration and not of limitation, and the present invention is limited only by the claims which follow.

What is claimed is:

1. A charge pump circuit having an input terminal, an output terminal and a plurality of capacitor banks, the charge pump circuit comprising:
   a plurality of current sources; and
   a plurality of switching circuits configured to selectively couple the capacitor banks to the input terminal, the output terminal, and to the plurality of current sources such that, during normal operation, current drawn through the input terminal, and unfiltered current provided by the output terminal, remain substantially constant.

2. The circuit of claim 1, wherein each of the plurality of capacitor banks further comprise one or more capacitors.

3. The circuit of claim 2, wherein each of the plurality of capacitor banks further comprise a plurality of switching elements that periodically couple the plurality of capacitors in series, parallel, or a combination thereof.

4. The circuit of claim 1, wherein at least one current source in the plurality of current sources is coupled to a clamp circuit.

5. The circuit of claim 1, wherein the plurality of capacitor banks coupled to the input terminal have different voltage levels.

6. The circuit of claim 1, wherein the plurality of capacitor banks coupled to the output terminal have different voltage levels.

7. The circuit of claim 1, wherein during a transition period, two capacitor banks of the plurality of capacitor banks are coupled to a first current source of the plurality of current sources and to the input terminal.

8. The circuit of claim 1, wherein during a transition period, two capacitor banks of the plurality of capacitor banks are coupled to a second current source of the plurality of current sources and to the output terminal.

9. The circuit of claim 7, wherein the first current source of the plurality of current sources is a charging current source.

10. The circuit of claim 7, wherein the first current source is coupled to a clamp circuit.

11. The circuit of claim 8, wherein the second current source of the plurality of current sources is a discharging current source.

12. The circuit of claim 1, configured to provide a boosted output voltage.

13. The circuit of claim 1, configured to provide a stepped down output voltage.

14. The circuit of claim 1, configured to provide a substantially isolated output voltage.

15. The circuit of claim 1, further including voltage regulation circuitry for producing a substantially constant output voltage.

16. The circuit of claim 15, wherein the voltage regulation circuitry comprises a shunt regulator coupled to the output terminal.

17. The circuit of claim 15, wherein the voltage regulation circuitry further comprises an amplifier circuit which provides a control signal based on a difference between the substantially constant output voltage and a reference voltage, the control signal controlling the substantially constant output current.

18. The circuit of claim 15, wherein the voltage regulation circuitry provides a control signal based on a difference between the substantially constant output voltage and a reference voltage, the control signal controlling at least one of the plurality of current sources.

19. The circuit of claim 16, wherein the voltage regulation circuitry provides a control signal based on a difference between the current flowing through the shunt regulator and a reference current, the control signal controlling at least one of the plurality of current sources.

20. A method for producing a voltage at an output terminal of a switching circuit having a plurality of capacitor circuits, and at least two current sources, the method comprising:
   disposing a plurality of switches in a circuit; and
   configuring the plurality of switches to selectively couple the capacitor circuits to the input terminal, the output terminal, and the current sources such that, during normal operation, current drawn through the input terminal, and unfiltered current provided by the output terminal, remain substantially constant.

21. The method of claim 20, wherein each of the plurality of capacitor circuits further comprise a plurality of switching elements that periodically couple the plurality of capacitors in series, parallel, or a combination thereof.

22. The method of claim 20, further comprising coupling at least one of the plurality of current sources to a clamp circuit.

23. The method of claim 20, wherein the plurality of capacitor circuits coupled to the input terminal have different voltage levels.

24. The method of claim 20, wherein the plurality of capacitor circuits coupled to the output terminal have different voltage levels.

25. The method of claim 20, further comprising, during a transition period, coupling two capacitor circuits from the plurality of capacitor circuits to a first current source of the plurality of current sources and to the input terminal.

26. The method of claim 20, further comprising, during a transition period, coupling two capacitor circuits from the plurality of capacitor circuits to a second current source of the plurality of current sources and to the output terminal.

27. The method of claim 25, wherein the first current source is a charging current source.

28. The method of claim 27, further comprising coupling the first current source to a clamp circuit.

29. The method of claim 26, wherein a second current source of the plurality of current source is a discharging current source.

30. The method of claim 20, further comprising configuring the switching circuit to provide a boosted output voltage.

31. The method of claim 20, further comprising configuring the switching circuit to provide a stepped down output voltage.

32. The method of claim 20, further comprising configuring the switching circuit to provide a substantially isolated output voltage.

33. The method of claim 20, further comprising providing voltage regulation circuitry for producing a substantially constant output voltage.

34. The method of claim 33, wherein providing voltage regulation circuitry further comprises coupling a shunt regulator coupled the output terminal of the switching circuit.

35. The method of claim 33, further comprising generating a control signal that controls the substantially constant output current, the control signal being based on a difference between the substantially constant output voltage and a reference voltage.

36. The method of claim 33, further comprising generating a control signal that controls at least one of the plurality of current sources, the control signal being based on a difference between the substantially constant output voltage and a reference voltage.

37. The method of claim 34, further comprising generating a control signal that controls at least one of the plurality of current sources, the control signal being generated by an amplifier circuit based on a difference between the current flowing through the shunt regulator and a reference current.

38. A charge pump circuit that provides a substantially constant output current, the charge pump circuit comprising:
   an input terminal and an output terminal;
   a first and second capacitor bank;
   a first current source for periodically charging the first and second capacitor banks;
   a second current source for periodically discharging the first and second capacitor banks; and
   a plurality of switching circuits configured to selectively couple the first and second capacitor banks to the first current source, the switching circuits further configured to selectively couple the first and second capacitor banks to the second current source;
   wherein at least one of the first and second capacitor banks is coupled to the second current source and further to the output in order to maintain the unfiltered output current substantially constant.

39. The circuit of claim 38, wherein the first and second capacitor banks are coupled, to the second current source, and further coupled to the output terminal during a first transition state.

40. The circuit of claim 39, wherein the first and second capacitor banks have different voltages during the first transition state.

41. The circuit of claim 38, where the charge pump draws a substantially constant input current.

42. The circuit of claim 41, where the first current source is coupled to a voltage clamp circuit.

43. The circuit of claim 38, further comprising additional capacitor banks and switches that operate in conjunction with the first and second capacitor banks to produce the substantially constant output current.

44. The circuit of claim 38, configured to provide a boosted output voltage.

45. The circuit of claim 38, configured to provide a stepped down output voltage.

46. The circuit of claim 38, configured to provide a substantially isolated output voltage.

47. The circuit of claim 38, further including voltage regulation circuitry for producing a substantially constant output voltage.

48. The circuit of claim 47, wherein the voltage regulation circuitry comprises a shunt regulator coupled to the output terminal.

49. The circuit of claim 47, wherein the voltage regulation circuitry further comprises an amplifier circuit which provides a control signal based on a difference between the substantially constant output voltage and a reference voltage, the control signal controlling the substantially constant output current.

50. The circuit of claim 47, wherein the voltage regulation circuitry provides a control signal based on a difference between the substantially constant output voltage and a reference voltage, the control signal controlling at least one of the plurality of current sources.

51. The circuit of claim 48, wherein the voltage regulation circuitry provides a control signal based on a difference between the current flowing through the shunt regulator and a reference current, the control signal controlling at least one of the plurality of current sources.

* * * * *